(12) United States Patent
Ozawa

(10) Patent No.: US 8,411,165 B2
(45) Date of Patent: Apr. 2, 2013

(54) MICROPHONE APPARATUS, REPRODUCING APPARATUS, AND IMAGE TAKING APPARATUS

(75) Inventor: Kazuhiko Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 10/968,700

(22) Filed: Oct. 19, 2004

(65) Prior Publication Data

US 2005/0140810 A1 Jun. 30, 2005

(30) Foreign Application Priority Data

Oct. 20, 2003 (JP) .................................. 2003-359769

(51) Int. Cl.
*H04N 5/76* (2006.01)
*H04R 3/00* (2006.01)
*H03M 7/00* (2006.01)

(52) U.S. Cl. ........................ 348/231.4; 381/92; 341/91

(58) Field of Classification Search ............ 348/333.01, 348/333.02, 211.99, 231.4, 373, 14.08; 381/92, 381/356, 357, 91, 310; 386/96; 341/91; 250/239; 396/373, 383
See application file for complete search history.

(56) References Cited

U.S. PATENT DOCUMENTS

| | | | | |
|---|---|---|---|---|
| 4,984,087 A * | 1/1991 | Fujimura et al. | ............... | 348/348 |
| 5,880,411 A * | 3/1999 | Gillespie et al. | ............ | 178/18.01 |
| 6,226,448 B1 * | 5/2001 | Takagi et al. | .................. | 386/118 |
| 6,593,956 B1 * | 7/2003 | Potts et al. | .................. | 348/14.09 |
| 6,593,958 B2 | 7/2003 | Kremen | | |
| 6,633,280 B1 * | 10/2003 | Matsumoto et al. | .......... | 345/173 |
| 6,654,007 B2 * | 11/2003 | Ito | .................. | 345/175 |
| 7,035,418 B1 * | 4/2006 | Okuno et al. | .................. | 381/310 |
| 7,057,643 B2 * | 6/2006 | Iida et al. | .................. | 348/208.14 |
| 7,206,418 B2 * | 4/2007 | Yang et al. | ........................ | 381/92 |
| 2001/0055059 A1 | 12/2001 | Satoda | | |
| 2002/0105588 A1 * | 8/2002 | Nishimura | ............... | 348/333.12 |
| 2002/0181722 A1 * | 12/2002 | Hibino et al. | .................... | 381/92 |
| 2003/0146905 A1 * | 8/2003 | Pihlaja | ........................ | 345/173 |
| 2003/0160862 A1 * | 8/2003 | Charlier et al. | ............. | 348/14.08 |
| 2003/0160891 A1 * | 8/2003 | Mikamo | ........................ | 348/375 |
| 2003/0169891 A1 * | 9/2003 | Ryan et al. | ........................ | 381/92 |
| 2005/0007445 A1 * | 1/2005 | Foote et al. | ................. | 348/14.08 |

FOREIGN PATENT DOCUMENTS

| | | |
|---|---|---|
| JP | 5 227531 | 9/1993 |
| JP | 09-116792 | 5/1997 |
| JP | 9-275533 | 10/1997 |
| JP | 2000-152049 | 5/2000 |
| JP | 2000 209689 | 7/2000 |
| JP | 2001 75000 | 3/2001 |
| TW | 519825 | 2/2003 |

* cited by examiner

*Primary Examiner* — Lin Ye
*Assistant Examiner* — Mekonnen Dagnew
(74) *Attorney, Agent, or Firm* — Frommer Lawrence & Haug LLP; William S. Frommer; Ellen Marcie Emas

(57) ABSTRACT

A microphone apparatus of the present invention is applied to a camera including a panel type view finder for displaying a picture taken by the camera, a touch panel for pointing a desired position of the picture displayed on the view finder, determining circuit for determining a direction of the real picture in accordance with the position pointed by the touch panel, a microphone device having a plurality of microphone units for collecting a sound that comes from the picture taken by the camera; and directivity generating circuit for generating a sound directivity signal with which the microphone device collects the sound coming from the direction determined by the determining circuit.

14 Claims, 19 Drawing Sheets

MICROPHONE APPARATUS, REPRODUCING APPARATUS, AND IMAGE TAKING APPARATUS

CROSS REFERENCE TO RELATED APPLICATION

This application claims priority from Japanese Priority Document No. 2003-359769, filed on Oct. 20, 2003 with the Japanese Patent Office, which document is hereby incorporated by reference.

BACKGROUND OF THE INVENTION

1. Field of the Invention

The present invention relates to a microphone apparatus, a reproducing apparatus, and an image taking apparatus.

2. Description of the Related Art

Most of portable video/audio recording and reproducing apparatuses such as video cameras and digital cameras put on a market in recent years have a panel type view finder with which an imaged picture or an imaging picture is monitored. The panel type view finder has a higher visibility than a conventional built-in finder (namely, a view finder through which the user observes an object with an ocular) because the panel type view finder allows the user to easily observe the picture even if he or she is not so close to the panel type view finder.

Some video/audio recording and reproducing apparatuses use the panel type view finder in common with an input device with which the user can input various operation keys. In particular, when the user touches the display screen of the panel with user's finger or a pen, the user can select a picture, an icon, or the like that appears on the display so as to input desirable information. This type of panel is generally called, for example, as a touch panel.

In particular, when the user directly points a portion of a picture displayed on the panel, a focusing and an exposure of an object to be imaged can be selectively and optimally performed or an object to be reproduced can be enlarged with the pointed object as its center. As a result, the user can optimally image or reproduce a desired object. This technology is disclosed in a published patent application that the applicant of the present patent application has filed, and that is referred to as Patent Document 1 listed below.

In recent years, while video cameras have become small, the number of functions is increased and advanced. That is, in addition to a lens, a finder, a battery, a recording medium slot, a remote controller light receiving portion, and so forth, these video cameras have many operation keys, input and output terminals, and so forth disposed throughout the entire outside of the video cameras. Of course, a built-in microphone is included therein.

In addition, most current video cameras have a rotatable panel type view finder. It has a higher visibility than the conventional built-in finder (namely, a view finder through which the user observes an object with the ocular) because the rotatable panel type view finder allows the user to easily observe the object at a position apart from the rotatable panel type view finder. In addition, since the rotatable panel type view finder allows the user to vary the panel angle in accordance with the image-taking angle of the object, the rotatable panel type view finder has been widely accepted because of the forgoing merit.

Another prior published patent application such as Patent Document 2 listed below filed by another company discloses a technology in which a microphone unit is disposed at a large screen display unit of an image taking apparatus. This prior patent application relates to an open/close type panel view finder. In addition, as disclosed in an embodiment of the prior art patent application, a microphone is disposed at a top end (or a lower end) of the open/close type panel view finder. The microphone is mechanically compensated against the open/close operations thereof. In contrast, according to the present patent application, a microphone is disposed on a rear surface of an open/close and rotatable type panel view finder. In addition, according to the present invention, a directivity of the microphone is electrically compensated relative to a rotation of the panel view finder.

Patent Document 1: Japanese Patent Laid-Open Patent No. HEI 9-116792

Patent Document 2: Japanese Patent Laid-Open Patent No. 2000-152049

SUMMARY OF THE INVENTION

A technology that selectively optimizes a sound or a voice issued from an object of the picture, and images and reproduces the picture together with the optimized sound or voice has been desired, but such technology has not been developed yet.

Therefore, the present invention proposes a new function by combining the forgoing pointing device and a microphone device. Thus, since a directivity of the microphone is directed toward the position of the picture that the user has pointed and the audio level of a relevant circuit is optimized, the object can be imaged and reproduced with the optimized sound and voice.

In addition, although the built-in microphone of the video camera is disposed at a position, where surrounding portion of the position is smooth, where the user cannot easily touch the microphone while user is imaging an object, and where the position is not acoustically shadowed. It becomes difficult to find a space for the microphone on the video camera, because the video camera is getting smaller.

In addition, when the microphone is disposed on the upper surface of the video camera, the forward voice sensitivity decreases. In this case, more unnecessary voice is adversely recorded than the voice from the target object. On the other hand, when the microphone is disposed on the front surface of the video camera, the un-smoothness of the front surface having a lens barrel and so forth acoustically shadow the microphone, and this may disturb the acoustic characteristic thereof. When the microphone protrudes from the body of the video camera, the tradeoff for a good acoustic characteristic is a large size and a low portability of the video camera.

Therefore, an aspect of the present invention was made from the foregoing point of view. An aspect of the present invention is to solve the foregoing problems with a built-in microphone disposed on a rear surface of a rotatable panel type view finder.

To solve the foregoing problem and accomplish the foregoing purpose, the present invention is a microphone apparatus comprising image taking means having at least an image pickup device and a image-taking optical system, displaying means for displaying a picture taken by said image taking means, pointing means for pointing a desired position of the picture displayed on the displaying means, determining means for determining a direction of the real picture in accordance with the position pointed by said pointing means, sound collecting means having a plurality of microphone units for collecting a sound that comes from the picture taken by said image taking means, and directivity generating means for generating a sound directivity signal with which said sound collecting means collects the sound coming from the direction determined by said determining means.

In addition, the present invention is a reproducing apparatus, comprising sound reproducing means for reproducing a plurality of audio signals that is collected by a plurality of microphone units of sound collecting means and is recorded to audio recording means, displaying means for reproducing and displaying a picture that is taken by image taking means and recorded by picture recording means, pointing means for pointing a desired position of the picture displayed by said displaying means, determining means for determining a direction of the imaged picture in accordance with the position pointed by said pointing means, and directivity generating means for generating a sound directivity signal of the sound reproduced by said sound reproducing means in the direction determined by said determining means.

Conventionally, a focusing control and an exposure control of an input picture are performed, and a desired reproduced picture is extracted/enlarged by operating a touch panel. In contrast, according to the present invention, a sound or a voice that an object corresponding to a pointed out picture generates can be extracted and the level of the extracted sound or voice can be optimized when the picture is taken and also reproduced.

In addition, the present invention is an image taking apparatus, comprising image taking means having at least an image pickup device and an image-taking optical system, displaying means for displaying a picture taken by said image taking means, and sound collecting means having a microphone unit disposed on a rear surface side of a picture display surface of said displaying means, wherein said displaying means is rotatable along with said sound collecting means.

Thus, since a built-in microphone is disposed on the rear surface of a standard rotatable liquid crystal panel type view finder of a recent standard video camera, many microphone units can be disposed without restriction as to arrangement thereof. In addition, the sound characteristic of the microphone can be improved. Moreover, the influence of the mechanical noise against the microphone can be suppressed. Furthermore, the variation of directivity of the microphone due to the rotation of the panel can be electrically compensated.

According to a first aspect of the present invention, when the user takes a picture in a noisy environment, for example, where many people are simultaneously talking, by pointing the picture the user is imaging, a sound or a voice that a desired object generates can be extracted and outputted. In addition, the user does not need to always take at the center of the picture an object whose voice the user wants to extract. For example, there could be many opportunities at which the user takes a picture of people who stand in line, and then the voice of only a desired person at one end can be extracted.

According to a second aspect of the present invention, since the user can point to an object on the panel as if the user selects a picture, a user interface that is easy to use and that has high operability can be accomplished.

According to a third aspect of the present invention, the position of a real object can be accurately calculated with an imaged picture in accordance with information about angle of view of a lens. In addition, the position of the real object can be calculated at any zoom position of a zoom lens.

According to a forth aspect of the present invention, as one type of directivity varying means, a delay adding system that adds delays of outputs of an array microphone is used. However, the directivity varying means is not limited to the delay adding system.

According to a fifth aspect of the present invention, when the output level of a sound or a voice extracted from a desired object is lower than the average output level of the surrounding sound, the output level of the sound or the voice extracted from the desired object is increased. In contrast, when the output level of the sound or the voice extracted from the desired object is higher than the average output level of the surrounding sound, the output level of the sound or the voice extracted from the desired object is decreased. As a result, the output level of the sound or voice extracted from the desired object can be optimized. Thus, the user can always clearly hear the extracted sound or voice. In addition, even if the user frequently points different positions on the panel, the sound level can be prevented from varying.

According to a sixth aspect of the present invention, since a sound or a voice of a desired object can be freely extracted from a reproduced picture that has been recorded, the user can repeatedly check the sound or voice of the desired object without restriction for the image-taken picture.

According to further aspects of the present invention, the user can obtain the same effect from a reproduced picture as that from an image-taken picture. While the user can point a picture to be focused and optimally exposed as described in Patent Document 1, the user can extract a voice according to the present invention. Thus, both a sound of a picture and an image of an object can be optimized. In addition, a picture can be effectively directed.

According to a further another aspect of the present invention, since a microphone is disposed on the rear surface of a relatively large rotatable panel of a small video camera, a plurality of microphones can be easily disposed without restriction as to arrangement thereof. In addition, an excellent sound characteristic of the microphone can be obtained. Moreover, as the panel is able to turn, the microphones can be directed to the target object. As a result, the microphone can be apart from noise of the body of the video camera. Furthermore, the directivity of an array microphone requiring many microphone units can be varied. In addition, a microphone having super directivity can be easily structured.

According to a still further aspect of the present invention, in addition to a monaural characteristic, a plurality of outputs such as a stereo characteristic can be easily obtained.

According to still further aspects of the present invention, since the directional characteristic of an array microphone is electrically varied in accordance with the rotation angle of a rotatable panel view finder, a microphone whose directional characteristic does not vary with the rotation of the panel can be structured. Since the rear surface of the rotatable panel is flat, an effect of a boundary microphone can be obtained. The meanings of the boundary effect are described as follows. That is, when a microphone is directly placed on a flat surface of a desk, a floor, or the like, since the difference between the propagating distance of a direct sound and the propagating distance of a reflected sound from the surface on which the microphone unit is disposed is small, their distortion due to interference is small and the frequency characteristic does not deteriorate. Thus, the characteristic of the microphone improves. This effect is referred to as the boundary effect.

DETAILED DESCRIPTION OF THE PREFERRED EMBODIMENTS

Figure 12:
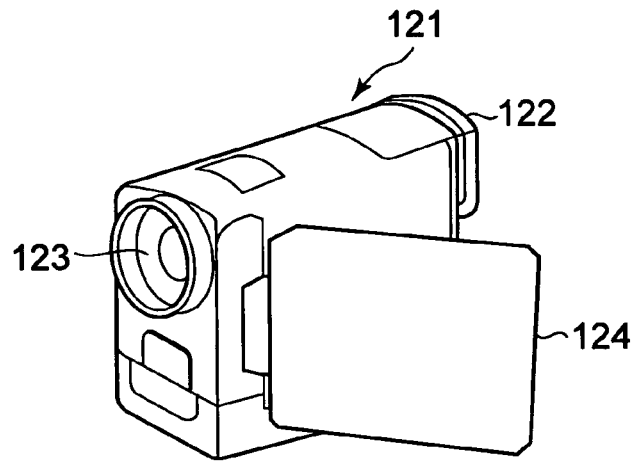
FIG. 12 is a schematic diagram showing an example of a panel type view finder of a video camera.

Next, with reference to the accompanying drawings, an embodiment of the present invention will be described. As shown in FIG. 12, most conventional home-use video cameras 121 have a panel type view finder 124 that can be spread out from a closed position that is in parallel with the direction of the optical axis of a zoom lens 123 to an open position that is perpendicular to the direction of the optical axis. The conventional video cameras 121 may not have a conventional eyepiece type view finder 122. The panel type view finder 124 is composed of an LCD (Liquid Crystal Display), a backlight, and so forth. The screen size of the most of the video cameras 121 is in the range from 2.5 to 3.5 inches for high visibility.

In recent years, the panel type view finder 124 may have provided with a touch panel with which a user can select a picture and an icon to input desired information by touching the display screen with user's finger or a pen. The touch panel of the video camera 121 is a kind of a pointing device with which the user can select an object of a picture. As disclosed in Patent Document 1, when the user points at a portion of a picture that appears on the touch panel, a focus control and an exposure control of the pointed picture are optimally performed. In addition, when the user points a picture that is reproduced, it can be enlarged with the pointed picture at its center. As a result, the user can optimally image or reproduce a desired picture of the object.

Figure 1:
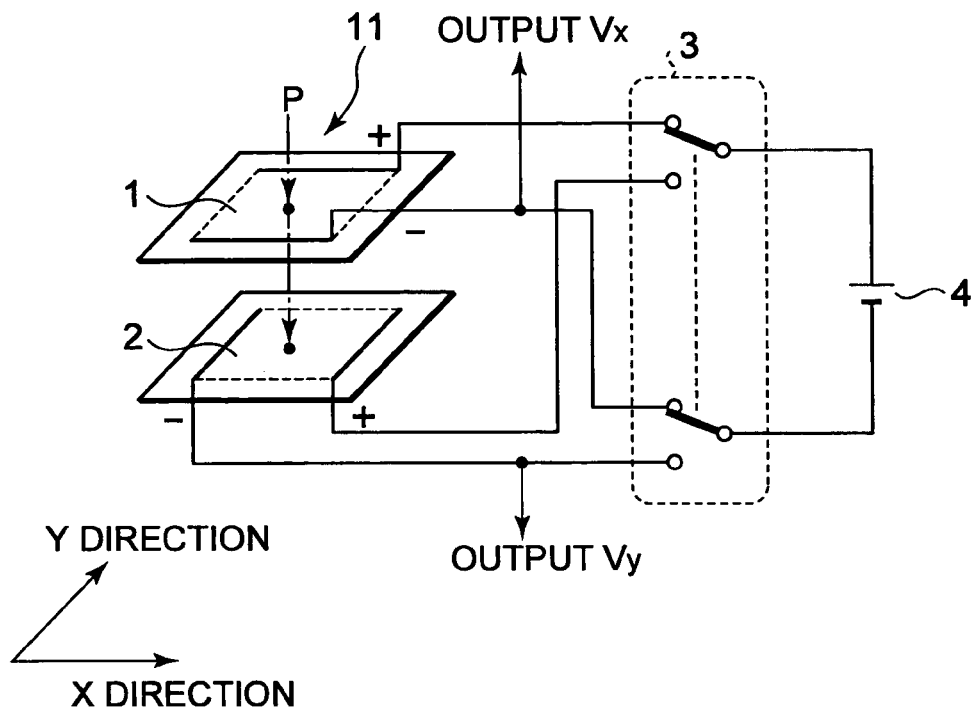
FIG. 1 is a schematic diagram showing an example of the structure of an electrically resistive film type touch panel.

To correlate the pointing device with the microphone, their constituent technologies according to the present invention will be described. The touch panel is a device that detects the position that the user points to on the touch panel, converts the detected position into a voltage value or the like, and outputs the converted voltage value. The position is detected by, for example, an electrically resistive film (written as "resistive film" hereinafter for simplicity). FIG. 1 shows the structure of a resistive film type touch panel.

A resistive type touch panel 11 has two transparent resistive films 1 and 2 that are oppositely disposed and that have parallel electrodes formed on their both sides. A selection switch SW 3 causes a power supply voltage of a power source 4 to be alternately applied to the parallel electrodes. The two sets of the parallel electrodes are perpendicularly disposed. Thus, the resistive films 1 and 2 each have potential distributions in the X and Y directions. When the selection switch SW 3 causes the power supply voltage of the power source 4 to be applied to the upper resistive film 1(Y), there is an input point at a point P. When the two resistive films 1 and 2 are contacted, the potential at the point P of the upper resistive film Y is read from an output Vy through the lower resistive film 2(X).

Instantaneously, the selection switch SW 3 causes a voltage to be applied to the lower resistive film 2(X). A potential at a P point of the lower resistive film 2(X), namely the potential in the X direction, is read from an output Vx through the upper resistive film 1(Y). Thus, when the switching period of time of the selection switch SW 3 is sufficiently shorter than the contact time of period of the input point, the input position is detected with the X and Y potentials at the point P.

The touch panel 11 having the foregoing structure is disposed on the display screen of the panel type view finder 124 of the video camera 121 or the like shown in FIG. 12. When the touch panel 11 is synthesized with a picture or an icon that appears on the view finder, the touch panel 11 can be operated as if the image or icon that is selected.

Figure 2:
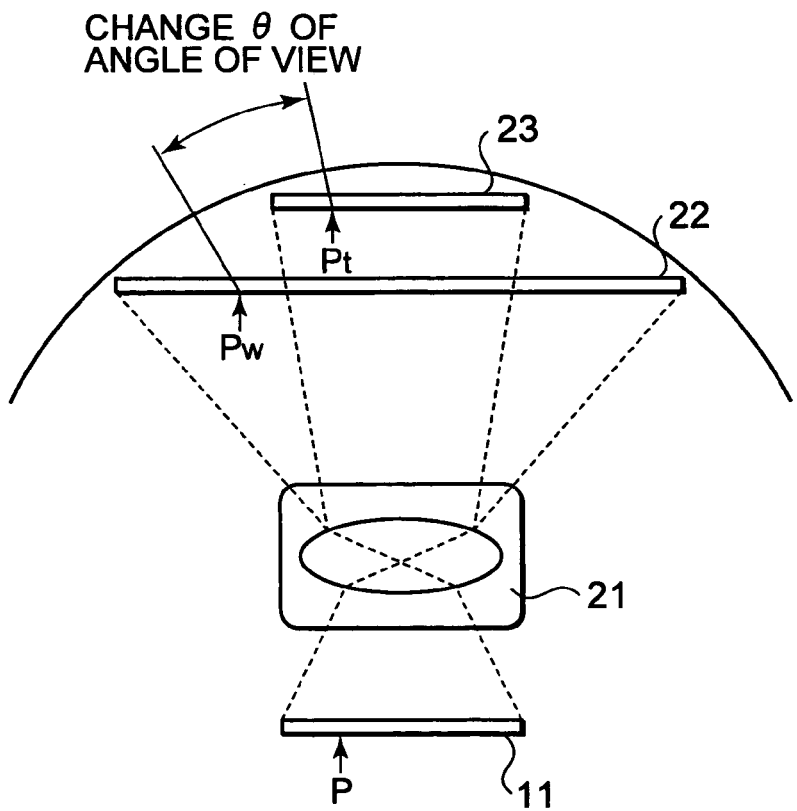
FIG. 2 is a schematic diagram describing a touch point and an angle of view.

Next, with reference to FIG. 2, the touch panel and an angle of view of the video camera will be described. A picture that is displayed on the panel type view finder 124 having the foregoing structure, is generated in a manner that an optical picture that passes through an optical system such as a zoom lens 21 or the like is converted into an electric signal by an image pickup device such as a CCD (Charge Coupled Device). Thus, when the zoom lens 21 is placed in a wide angle picture size 22, any input point P on the touch panel 11 becomes a point Pw. In contrast, when the zoom lens 21 is placed in a telescopic picture size 23, any input point P on the resistive type touch panel 11 becomes a point Pt. Thus, when the zoom lens 21 is moved, the angle of view changes by θ. Thus, according to the present invention, the direction of an object that the user points is compensated in accordance with information about the zoom position.

Figure 4:
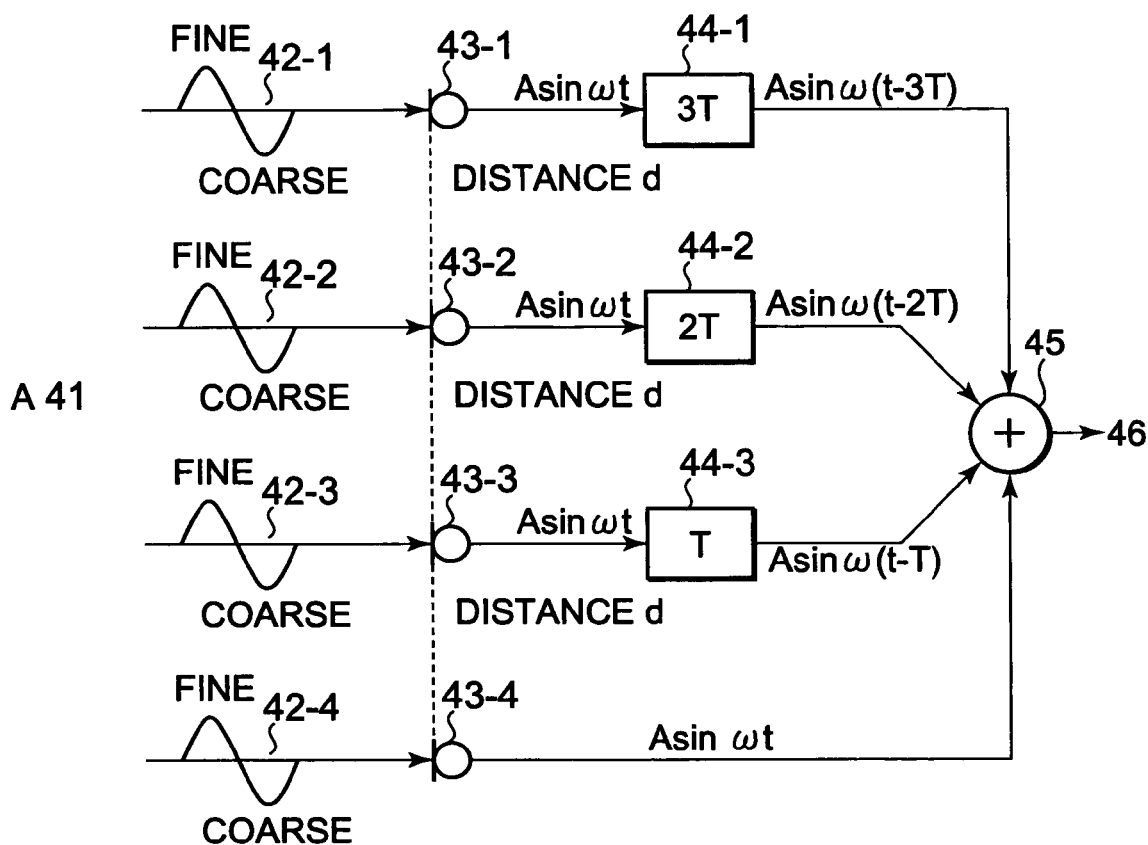
FIG. 4 is a first theoretical diagram of an array microphone.

Next, with reference to FIG. 4 and FIG. 5 that are schematic diagrams showing the theory of an array microphone, an example of a method of which the directivity of the microphone is varied will be described. In FIG. 4, the case that four microphones 43-1 to 43-4 are linearly arranged at intervals of distance d. Outputs of the microphones 43-1 to 43-3 are inputted to an adding circuit 45 through delay circuits 44-1 to 44-3, respectively. The adding circuit 45 adds outputs of the delay circuits 44-1 to 44-3 and an output of the microphone 43-4 and obtains an output 46. The delay circuit 44-1 delays its input by a delay of 3T. The delay circuit 44-2 delays its input by a delay of 2T. The delay circuit 44-3 delays its input by a delay of T.

Assuming that a sine wave having an amplitude A is inputted from a sound source A 41 that has an equidistance to each microphone, all the outputs of the microphones are A sin ωt. The outputs of the microphones are delayed by the delay circuits 44-1 to 44-3 and then added by the adding circuit 45. Thus, the adding circuit 45 adds the inputs with a delay difference of T each. When two sine waves having a delay difference of T are added, the result is given by Formula 1. In the Formula 1, for simplicity, it is assumed that A=1.

$$\sin \omega t + \sin \omega(t-T) = 2 \cos(\pi fT) \cdot \sin(\omega t - \pi fT) \qquad \text{[Formula 1]}$$

Figure 6:
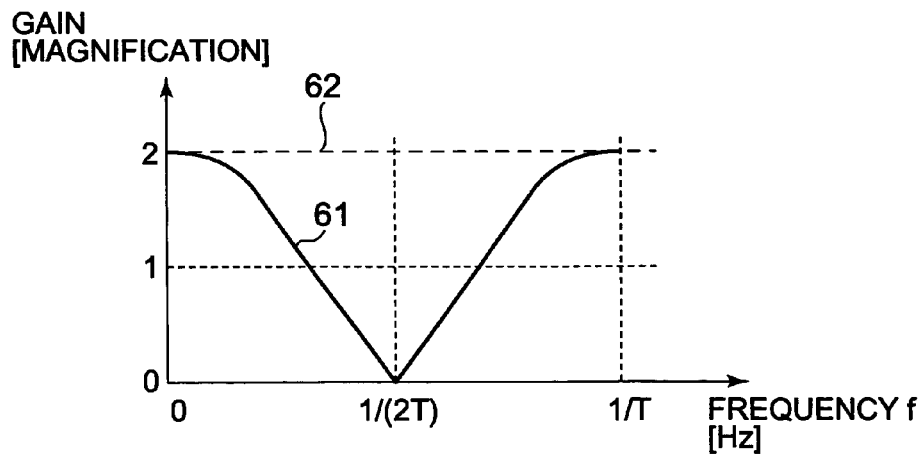
FIG. 6 is a schematic diagram showing an example of a frequency characteristic of which two signals are added.

An example of a frequency characteristic of which the absolute value of the amplitude term 2 cos(πfT) of the Formula 1 is plotted on the vertical axis and the frequency f plotted on the horizontal axis is normalized with a delay difference of T is denoted by a solid line 61 in FIG. 6. In FIG. 6, when the frequency is 1/(2T), the gain becomes the minimum value, that is zero. When the frequency is zero or 1/T, the gain becomes the maximum value, that is 2. These relations are repeated. For example, T=50 [μs] corresponds with a distance difference of around 17 mm as the speed of sound. When the frequency is increased from zero, the amplitude is decreased. At 10 kHz, the amplitude becomes zero, and at 20 kHz, the amplitude becomes the maximum value again. In other words, when signals each having an amplitude of A are added almost throughout the audio frequency band, the amplitude of the added signals does not become twice as large as A, but decreases. The decreasing rate of the amplitude is proportional to the number of signals to be added.

Figure 5:
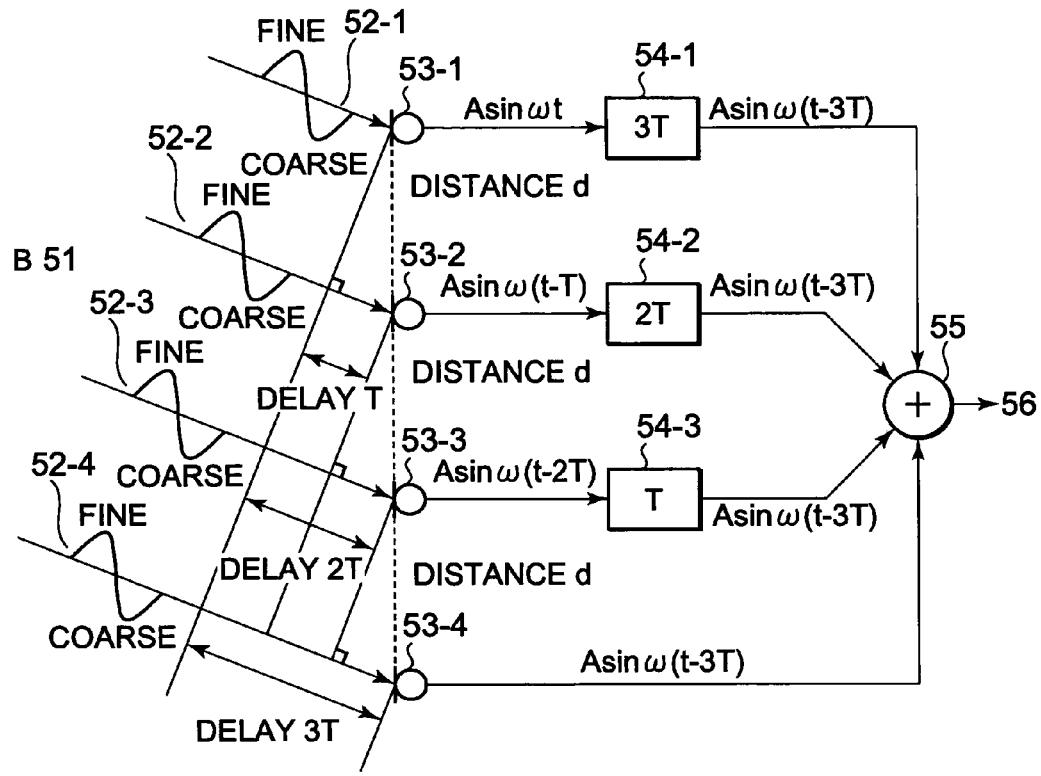
FIG. 5 is a second theoretical diagram of an array microphone.

FIG. 5 shows the case that sine waves each having an amplitude of A are inputted to the microphones arranged in the same manner as FIG. 4 with a predetermined angle from a sound source B 51.

A microphone 53-1 outputs A sin ωt. A delay circuit 54-1 delays A sin ωt by 3T. A sound wave that reaches a microphone 53-2 has a delay of T against the sound A sin ωt that reaches the microphone 53-1. Thus, the microphone 53-2 outputs A sin ω(t–T). A delay circuit delays A sin ω(t–T) by 2T.

Likewise, since a sound wave arrives at a microphone 53-3 with a delay of 2T against the sound wave that arrives at the microphone 53-1, the microphone 53-3 outputs A sin ω(t–2T). A delay circuit 54-3 delays A sin ω(t–2T) by T. Thus, since a sound wave arrives at a microphone 53-4 with a delay of 3T against the sound wave that arrives at the microphone 53-1, the microphone 53-4 outputs A sin ω(t–3T). When two sine waves are added in the same phase, the amplitude thereof becomes double throughout the audio frequency band as denoted by a dotted line 62. Thus, since the adding circuit 55 adds these outputs 56 in the same phase, the resultant amplitude becomes four times as large as A.

The array microphones shown in FIG. 4 and FIG. 5 can have directional selectivity of a sound wave that arrives from a sound source B 51. When the delay of T is varied, these array microphones can have directivity at any directional angle. The number of microphones and the arrangement thereof shown in FIG. 4 and FIG. 5 can be changed as long as they do not apart from the foregoing theory.

Figure 3:
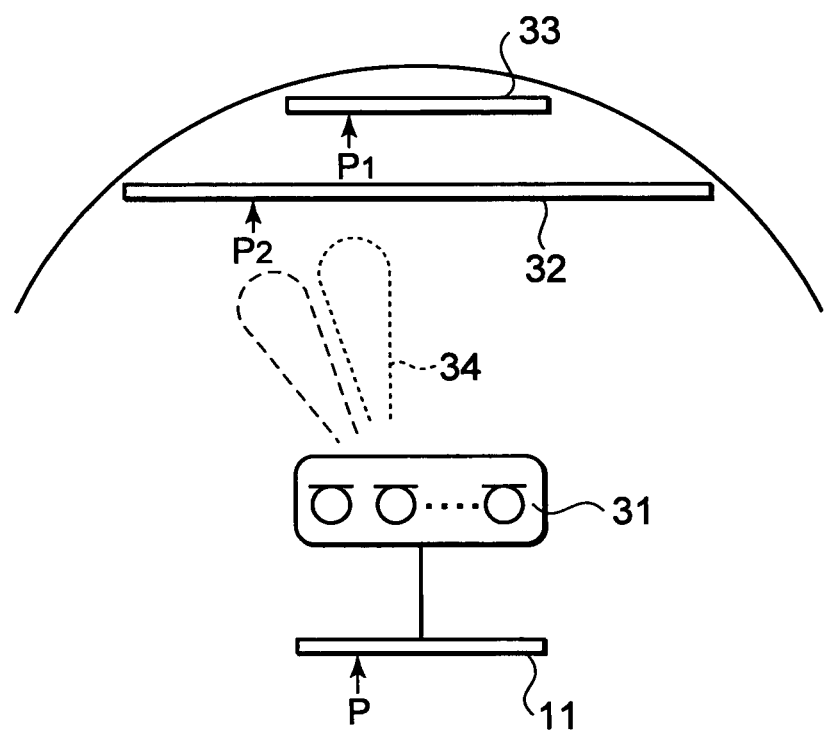
FIG. 3 is a schematic diagram describing a touch point and directivity of a microphone.

With the array microphones that have the foregoing structures, a variable directivity 34 of the microphone array 31 can be changed as denoted by a dotted line shown in FIG. 3 against the point P1 of the telescopic picture size 33 and the point P2 of the wide angle picture size 32 calculated in accordance with the position of the input point P of the touch panel 11 and the zoom position of the zoom lens 21, so that the initial object can be accomplished.

Figure 7:
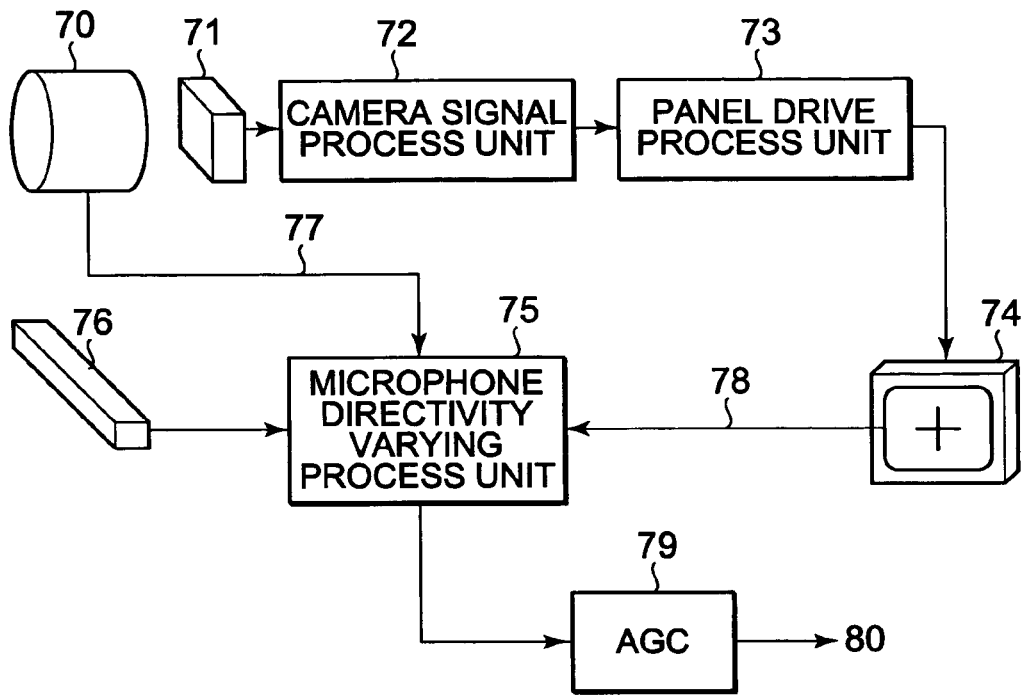
FIG. 7 is a schematic diagram showing a first example of a pointing microphone apparatus.

FIG. 7 shows a first example of a pointing microphone apparatus according to the present invention, and this example will be described hereinafter. A video signal is outputted from a CCD 71 through a zoom lens 70. A camera signal process unit 72 converts the video signal into a predetermined signal. A panel driving process unit 73 generates a video signal and a synchronous signal necessary for a touch panel type view finder 74 and supplies them thereto. The touch panel type view finder 74 outputs a pointing position signal. The pointing position signal is inputted to a microphone directivity varying process unit 75 that will be described later.

A zoom position signal 77 that is outputted from the zoom lens 70 and a plurality of microphone signals that are input from the array microphone 76 are inputted to the microphone directivity varying process unit 75. A signal processed in the microphone directivity varying process unit 75 is optimized by an AGC (Automatic Gain Control) 79 in a predetermined signal level and outputted as an audio signal 80.

Figure 8:
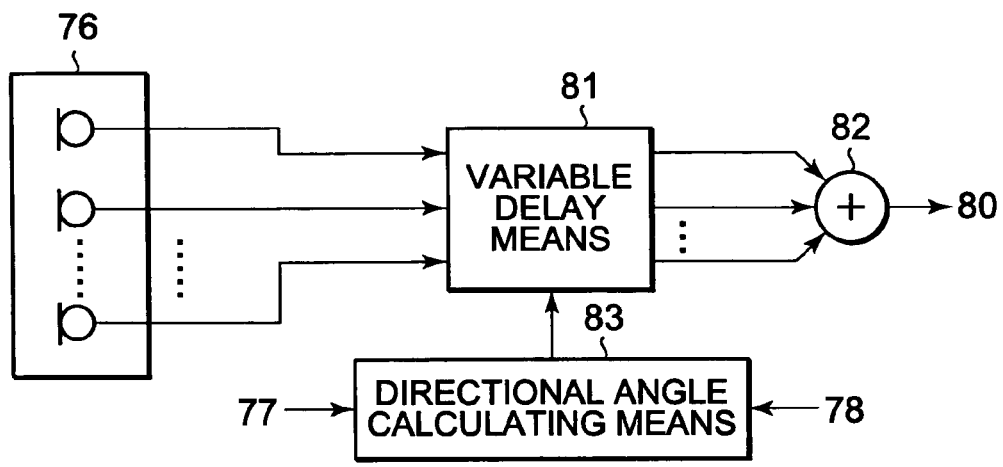
FIG. 8 is a schematic diagram showing a first example of a variably directional microphone.

In FIG. 8, the microphone directivity varying process unit 75 shown in FIG. 7 will be described. In the microphone directivity varying process unit 75, the theory of the array microphones described in FIG. 4 and FIG. 5 is used. Outputs of the array microphone 76 are inputted to variably delay means 81. The variably delay means 81 independently performs a delaying process for each output of the array microphone 76. The delaying process varies the delay periods of time of the outputs of the array microphone 76, and the directivity is maximized at the directional angle calculated by directional angle calculating means 83 with the zoom position signal 77 and the pointing position signal 78. In addition, an adding circuit 82 adds the delayed outputs. As a result, a sound or a voice at the directional angle that the user points on the touch panel is outputted.

Figure 9:
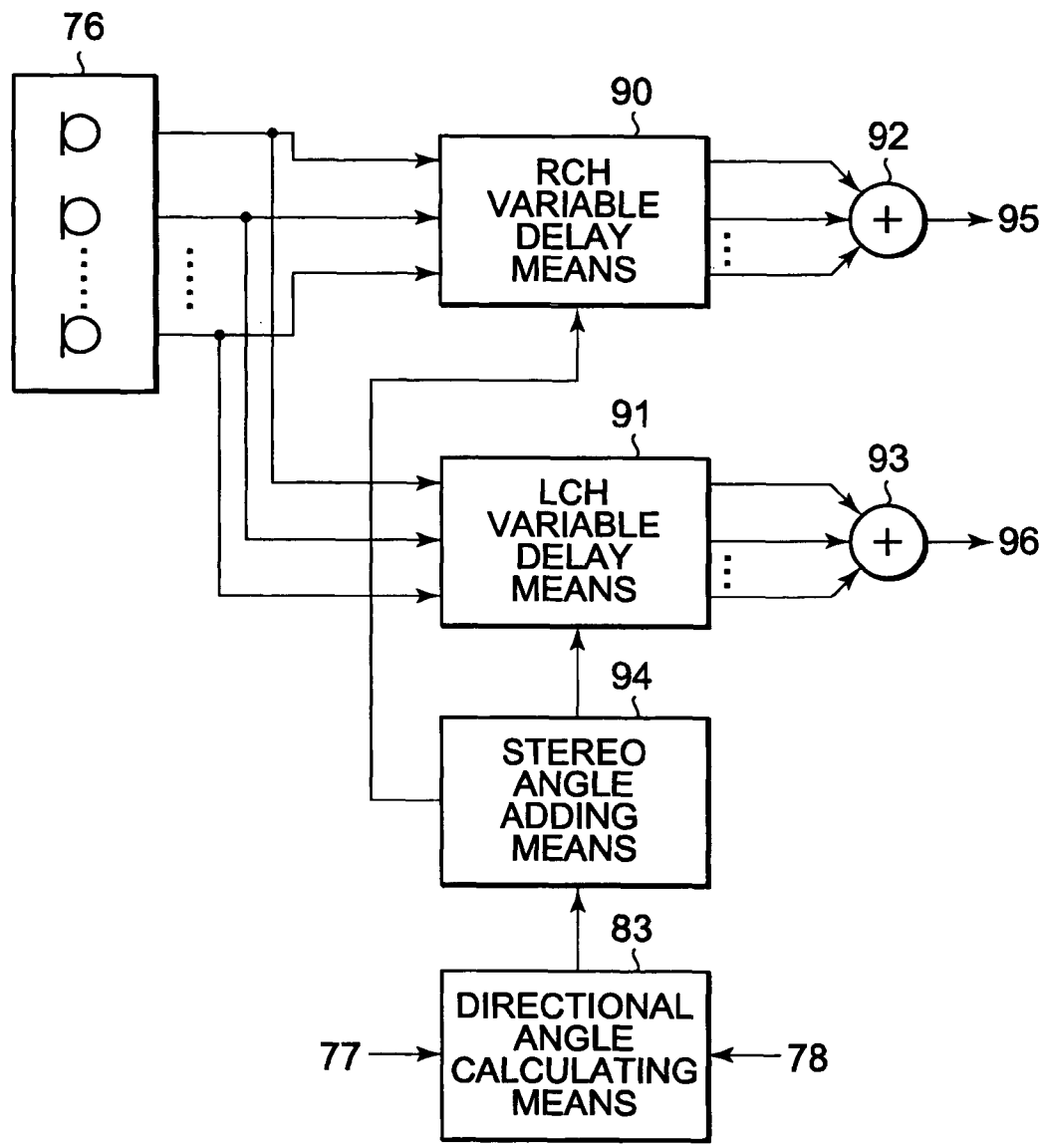
FIG. 9 is a schematic diagram showing a second example of a variably directional microphone.

FIG. 9 shows a second example of the directivity variable microphone. In FIG. 9, a plurality of audio outputs, for example, two outputs of stereo outputs Rch and Lch, are obtained from the array microphone 76 in contrast with that shown in FIG. 8. Outputs of the array microphone 76 that is the same as that shown in FIG. 8 are inputted to Rch variably delay means 90 and Lch variably delay means 91.

Stereo angle adding means 94 adds a new directional angle to the directional angle that is obtained from directional angle calculating means 83 that is the same as that shown in FIG. 8. The stereo angle adding means 94 outputs delay periods of time at which the directivity is maximized at the directional angles to the Rch variably delay means 90 and the Lch variably delay means 91. Outputs of the Rch variably delay means 90 are added by an adding circuit 92. Outputs of the Lch variably delay means 91 are added by an adding circuit 93. The adding circuits 92 and 93 output an Rch output 95 and an Lch output 96, respectively.

Thus, in FIG. 9, a stereo sound or a stereo voice centered at a directional angle that the user points to on the touch panel can be obtained. In this embodiment, the case of two outputs is described. Alternatively, more than two outputs may be obtained.

In the foregoing embodiment, it is assumed that only one array microphone is disposed. Since a human being has a pair of ears on the left and right of its face, the horizontally directional sensitivity is greater than the vertically directional, sensitivity. Normally, the change of the directional angle of the array microphone is effective in only the horizontal direction. In this case, the touch panel shown in FIG. 1 may have only the X direction. However, when the vertical direction is added, a more highly accurate directional angle can be obtained.

Figure 10:
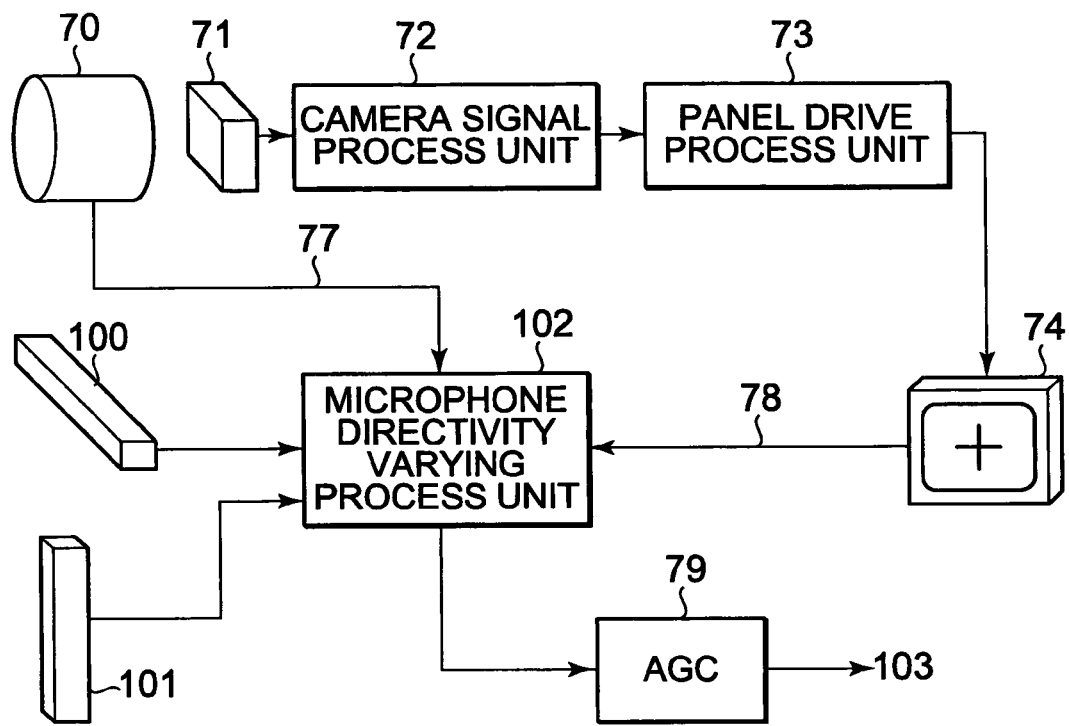
FIG. 10 is a schematic diagram showing a second example of a pointing microphone apparatus.

Thus, in FIG. 10, as a second example of the pointing microphone apparatus, a horizontal array microphone 100 and a vertical array microphone 101 are disposed. A microphone's directivity varying process 102 processes outputs of the horizontal array microphone 100 and the vertical array microphone 101. As a result, a sound or a voice at any directional angle that the user points to on a touch panel is output. In FIG. 10, the same functional blocks as those shown in FIG. 7 will be denoted by the same reference numerals and their description will be omitted.

Figure 11:
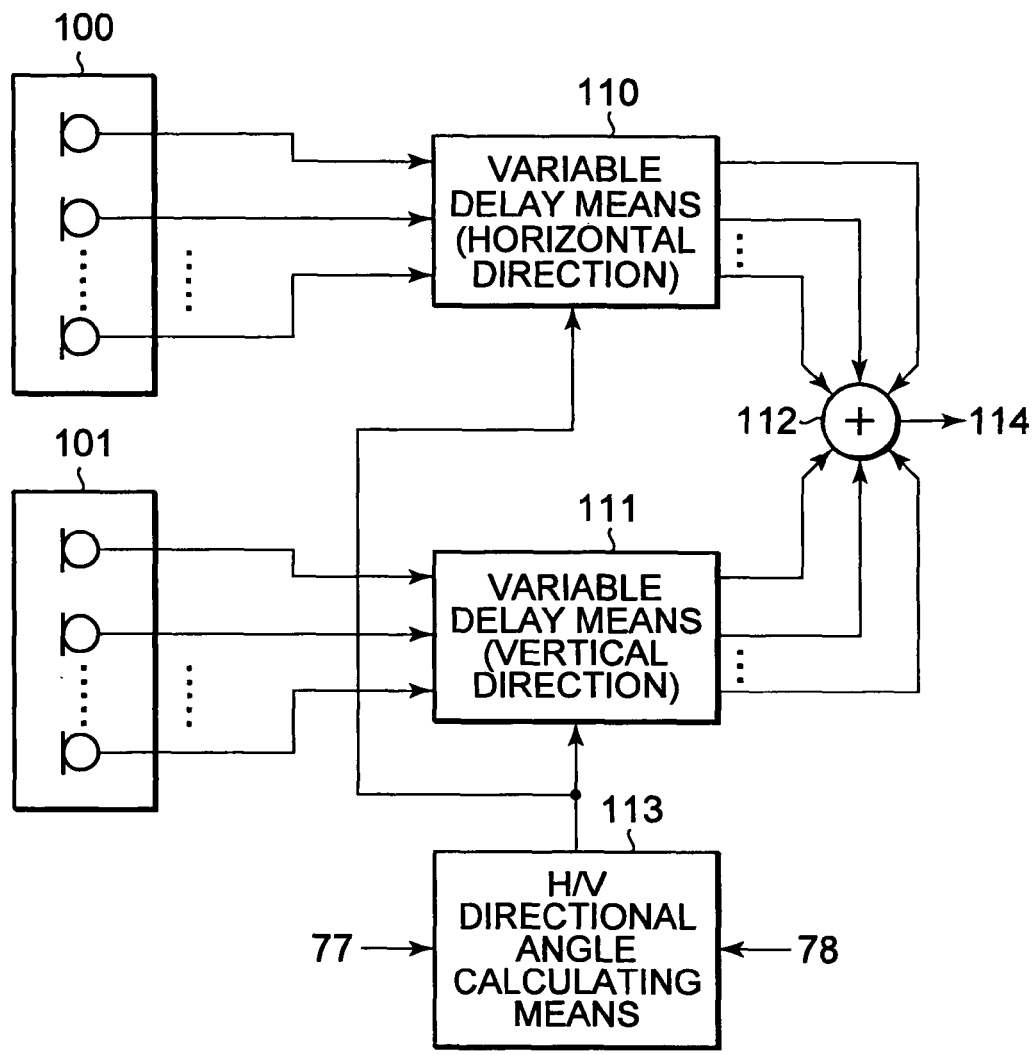
FIG. 11 is a schematic diagram showing a third example of a variably directional microphone.

Next, with reference to FIG. 11, the microphone directivity varying process unit 102 shown in FIG. 10 will be described. An output of the horizontal array microphone 100 is inputted to variably delay means (horizontal direction) 110. An output of the vertical array microphone 101 is inputted to vertically delay means (vertical direction) 111. Horizontal/vertical delay periods of time are inputted to the varying delay means (horizontal direction) 110 and the variably delay means (vertical direction) 111, and the directivity is maximized at the directional angle calculated by horizontal/vertical directional angle calculating means 113 in accordance with the zoom position signal 77 and the pointing position signal 78. The delayed outputs of the varying delay means (horizontal direction) 110 and the variably delay means (vertical direction) 111 are added by an adding circuit 112 and outputted as an audio signal 114. As a result, a desired signal is obtained.

Figure 13:
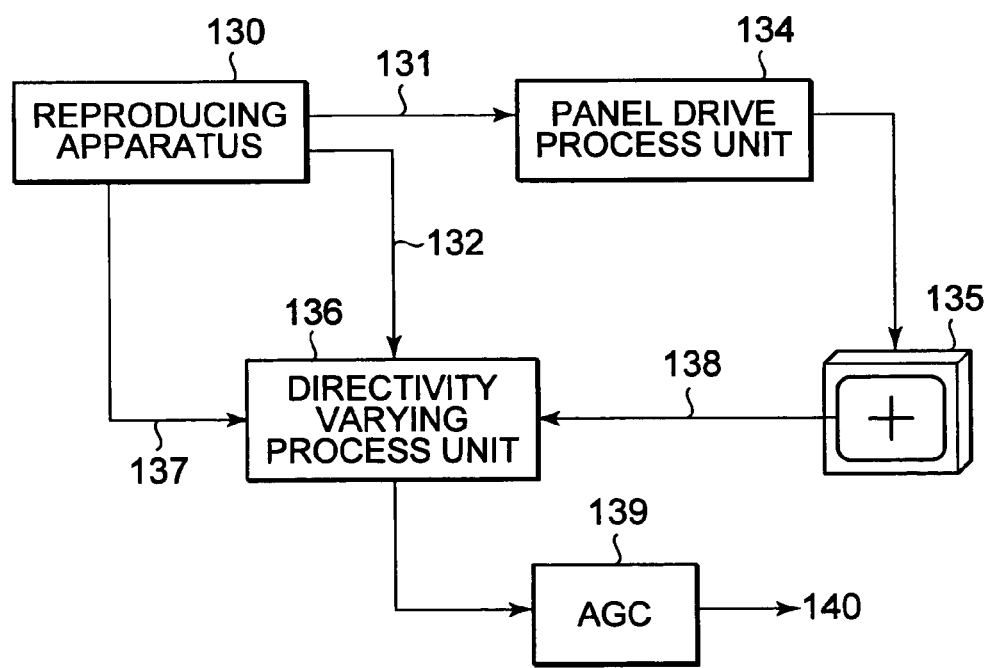
FIG. 13 is a schematic diagram showing a third example of a pointing microphone apparatus.

Next, in a third example of the pointing microphone apparatus, shown in FIG. 13, an example of which the selectivity is selected in accordance with a plurality of audio signals 132 recorded in a reproducing apparatus 130 and a zoom position signal 137 will be described. When the reproducing apparatus 130 is a recording and reproducing apparatus for a digital video (DV) format tape, the apparatus can record up to four channels of video signals to a magnetic tape. The digital video format tape also has a record area for auxiliary information such as a zoom position. In addition, on a DVD (Digital Versatile Disc) as a recording medium, multi channels of audio and auxiliary information can be recorded.

Thus, when audio signals of an array microphone and zoom position information are pre-recorded and they are reproduced by the reproducing apparatus 130, the same function as the image-taking operation can be accomplished. A panel driving process unit 134 generates a video signal and a synchronous signal necessary for a touch panel type view finder 135. The video signal and the synchronous signal are supplied to the touch panel type view finder 135. The touch panel type view finder 135 outputs a pointing position signal 138. The pointing position signal 138 is inputted to a microphone directivity varying process unit 136 having the same structure as the forgoing examples.

The zoom position signal 137 that is outputted from the reproducing apparatus 130 and the plurality of audio signals 132 that are output from the reproducing apparatus 130 are inputted to the microphone directivity varying process unit 136. The processed desired directional signal is optimized to a desired signal level by an AGC (Automatic Gain Control) 139. The optimized signal is output as an audio signal 140. Thus, the present invention can be applied to the case that a picture is reproduced.

In addition, according to the embodiment of the present invention, an audio signal extracted at any directional angle is outputted through the AGC. When the level of an audio signal to be extracted is lower than the level of the surrounding environmental sound and voice, after the desired audio signal is extracted, the AGC allows the level of the desired audio signal to be increased. As a result, the effect of which a desired audio is extracted can be further improved. In addition, since the level difference that varies depending on the pointing position is absorbed, the user can easily hear the desired audio.

Next, an example of the arrangement of the array microphone will be described. Most conventional home-use video cameras have a rotatable panel type view finder (hereinafter referred to as rotatable panel). The conventional video cameras may not have a conventional eyepiece type view finder. The rotatable panel is composed of a liquid crystal display (LCD), a backlight, and so forth. The screen size of the most of video cameras is in the range from 2.5 to 3.5 inches for high visibility. The rear surface (rear side of the display) of the rotatable panel is flat and has a sufficient space for a built-in microphone.

Thus, according to the present invention, since a built-in microphone is disposed on the rear surface of the rotatable panel, the following merits can be obtained.

First, the microphone can be directed in the forward direction of the video camera (object side). Thus, the directivity of the microphone is high. Second, when the rotatable panel is opened, since the microphone is apart from the video camera, the sound characteristic is improved. In addition, the mechanical noise of the body from the video camera can be suppressed. Third, when the rotatable panel is rotated, the directivity of the microphone can be easily changed. Fourth, since the area for the microphone is larger than that of the conventional video camera, the directivity of the array microphone having a plurality of microphones can be changed. In addition, a microphone having super directivity can be easily accomplished. Fifth, a new function having a microphone disposed at the standard position and a microphone disposed on the rotatable panel can be accomplished.

Figure 14:
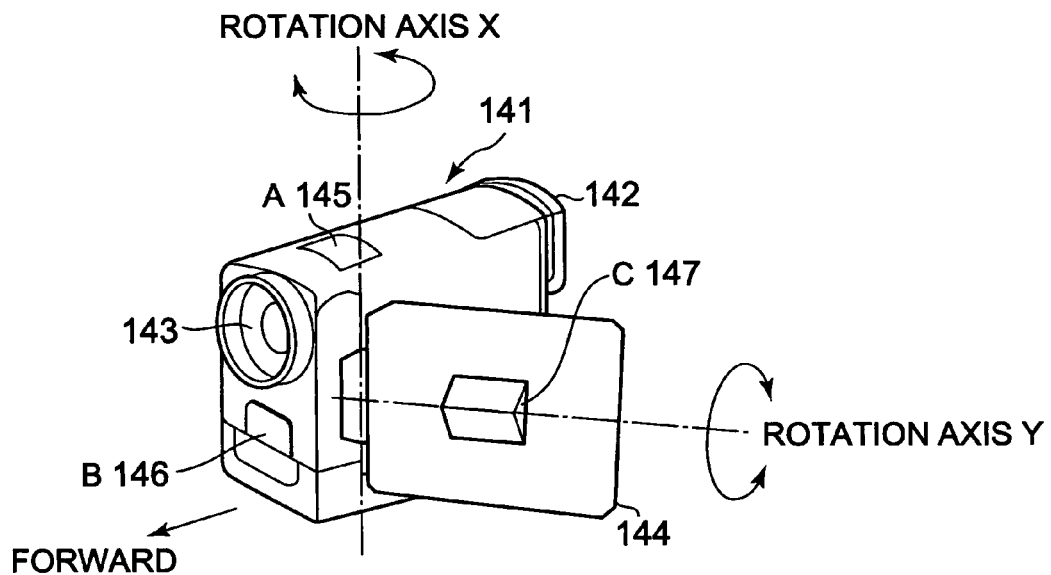
FIG. 14 is a schematic diagram showing a first example of the arrangement of a microphone of a video camera.

With reference to FIG. 14, an example of the arrangement of a microphone of a video camera will be described. Assuming that a lens 143 is disposed in the forward direction, on a conventional video camera 141, a microphone is normally disposed at a microphone position A 145, a microphone position B 146 (or another position (not shown) at which the microphone protrudes in a stick shape from the body of the video camera). The microphone position A 145 is on the upper surface of the video camera. The microphone position B 146 is in front of the video camera. As described in the "Related Art" section, when the microphone is disposed at the microphone position A 145, since the sound collecting surface of the microphone faces upward, the voice of the object becomes weak.

When the microphone is disposed at the microphone position B 146, the lens 143 disposed above the microphone acoustically shadows the microphone. Thus, the lens adversely affects the sound field. In contrast, according to the present invention, since the microphone is disposed on the rear surface of a rotatable panel 144, namely a microphone position C 147, these problems can be solved. In addition, the foregoing merits can be obtained.

The rotatable panel 144 shown in FIG. 14 is generally rotated around both the rotation axis X and the rotation axis Y. Thus, the visibility of the user can be secured at various image-taking angles of the video camera 141.

Figure 15:
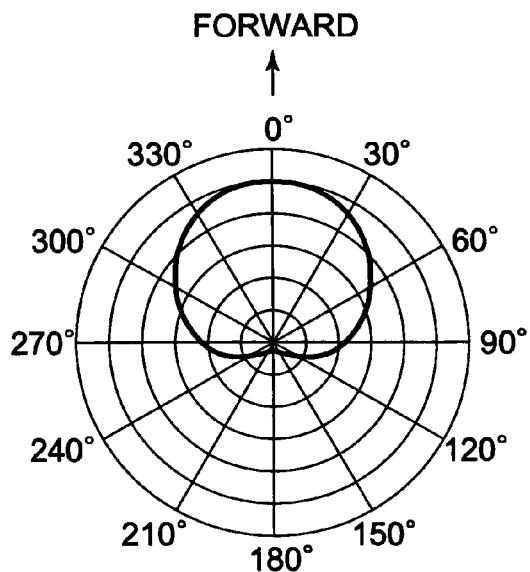
FIG. 15 is a schematic diagram showing an example of a monaural directivity.
Figure 16:
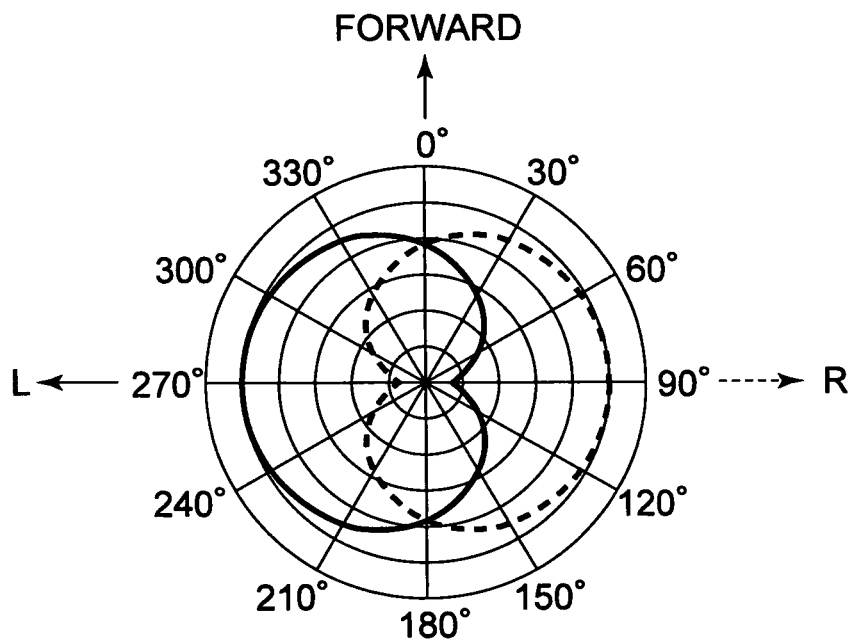
FIG. 16 is a schematic diagram showing a first example of a stereo directivity.

One or more microphones may be disposed at the microphone position C 147. As an example of the directivity of one microphone disposed at the microphone position C 147, an example of a normal directivity is shown in FIG. 15. When the forward direction of the microphone is 0°, the selectivity in this direction is the highest. As an example of the directivity of a plurality of microphones disposed at the microphone position C 147, an example of a stereo directivity is shown in FIG. 16. In FIG. 16, a stereo characteristic can be obtained with a characteristic of Lch having the main axis of directivity at 270° denoted by a solid line and a characteristic of Rch having the main axis of directivity at 90° denoted by a dotted line.

Figure 17:
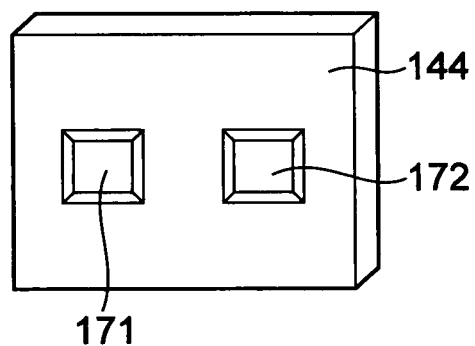
FIG. 17 is a schematic diagram showing a second example of the arrangement of microphones.

FIG. 17 shows a second example of the arrangement of the microphone according to the present invention. FIG. 17 shows an example of the structure of stereo microphones. According to the present invention, the rotatable panel 144 generally has a screen size in the range from 2.5 inches to 3.5 inches. However, since the diameters of the microphones disposed on the rear surface of the rotatable panel 144 are as small as φ 4 mm to φ 6 mm, an Lch microphone 172 and an Rch microphone 171 can be sufficiently spaced. As a result, a sufficient separation characteristic can be obtained.

When the rotatable panel 144 shown in FIG. 14 is rotated around the rotation axis X and the rotation axis Y, the direction of the main axis of directivity of the microphone also varies. This results in the foregoing first to third merits. However, a way can be expected that the directivity of the microphone of the video camera 141 may be fixed according to the conventional microphone position A 145 or B 146.

Next, an array microphone system that accomplishes the sufficient separation characteristic will be described. The first theoretical diagram shown in FIG. 4 and the solid line 61 of the frequency characteristic shown in FIG. 6 represent that when the frequency is $1/(2T)$, the gain becomes the minimum value, that is zero. When the frequency is zero or $1/T$, the gain becomes the maximum value, that is 2. These relations are repeated. For example, T=50 [μs] corresponds with a distance difference of around 17 mm as the speed of sound. When the frequency is increased from zero, the amplitude is decreased. At 10 kHz, the amplitude becomes zero, and at 20 kHz, the amplitude becomes the maximum value again.

Figure 19:
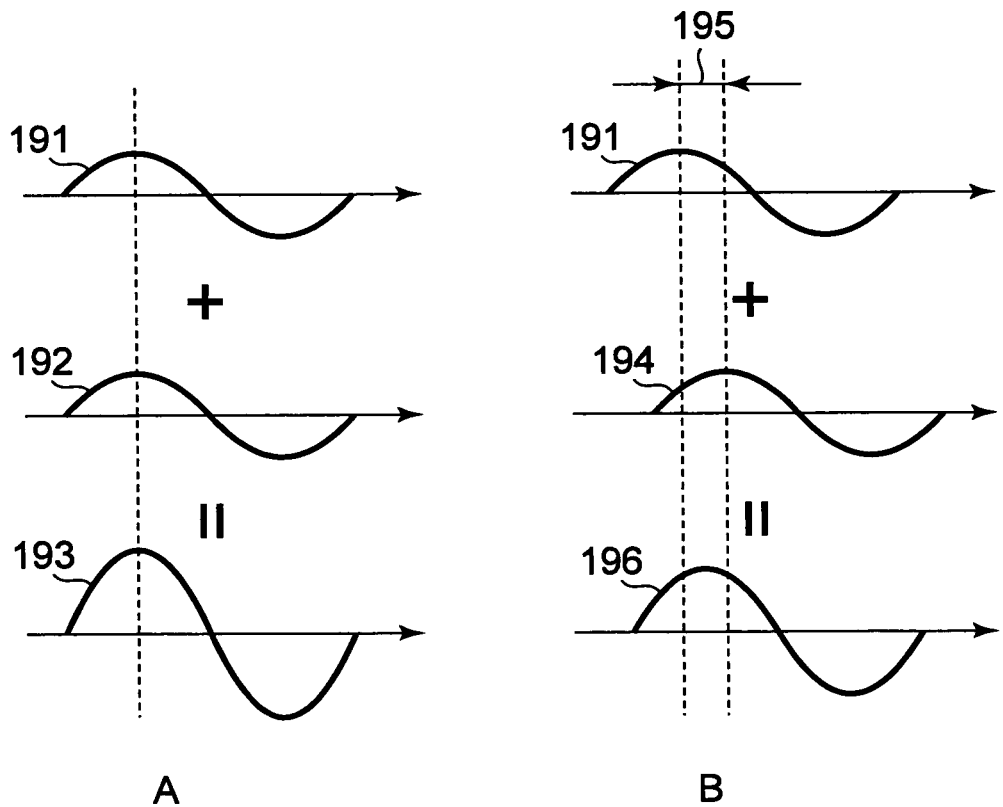
FIG. 19 is a third theoretical diagram of an array microphone, wherein A shows that signals are added without a delay, and B shows that signals are added with a delay.

In other words, B in FIG. 19 represents that when signals 191 and 194 each having a delay 195 and an amplitude of A are added almost throughout the audio frequency band, the amplitude of the added signal 196 does not become twice as large as A, but decreases. The decreasing rate of the amplitude is proportional to the number of signals to be added.

A second theoretical diagram of the array microphone shown in FIG. 5, the dotted line 62 shown in FIG. 6, and A in FIG. 19 represent that when the signals 191 and 192 without the delay 195 throughout the audio frequency band are added, the amplitude of a signal 193 is twice as large as that of each of the signals 191 and 192. Thus, since the adding device adds these outputs in the same phase, the amplitude of the resultant signal is four times as large as A.

The array microphones shown in FIG. 4 and FIG. 5 can have directional selectivity of a sound wave that arrives from a sound source B 51. When the delay of T is varied, these array microphones can have directivity at any directional angle. The number of microphones and the arrangement thereof shown in FIG. 4 and FIG. 5 can be changed as long as they do not apart from the foregoing theory.

Figure 23:
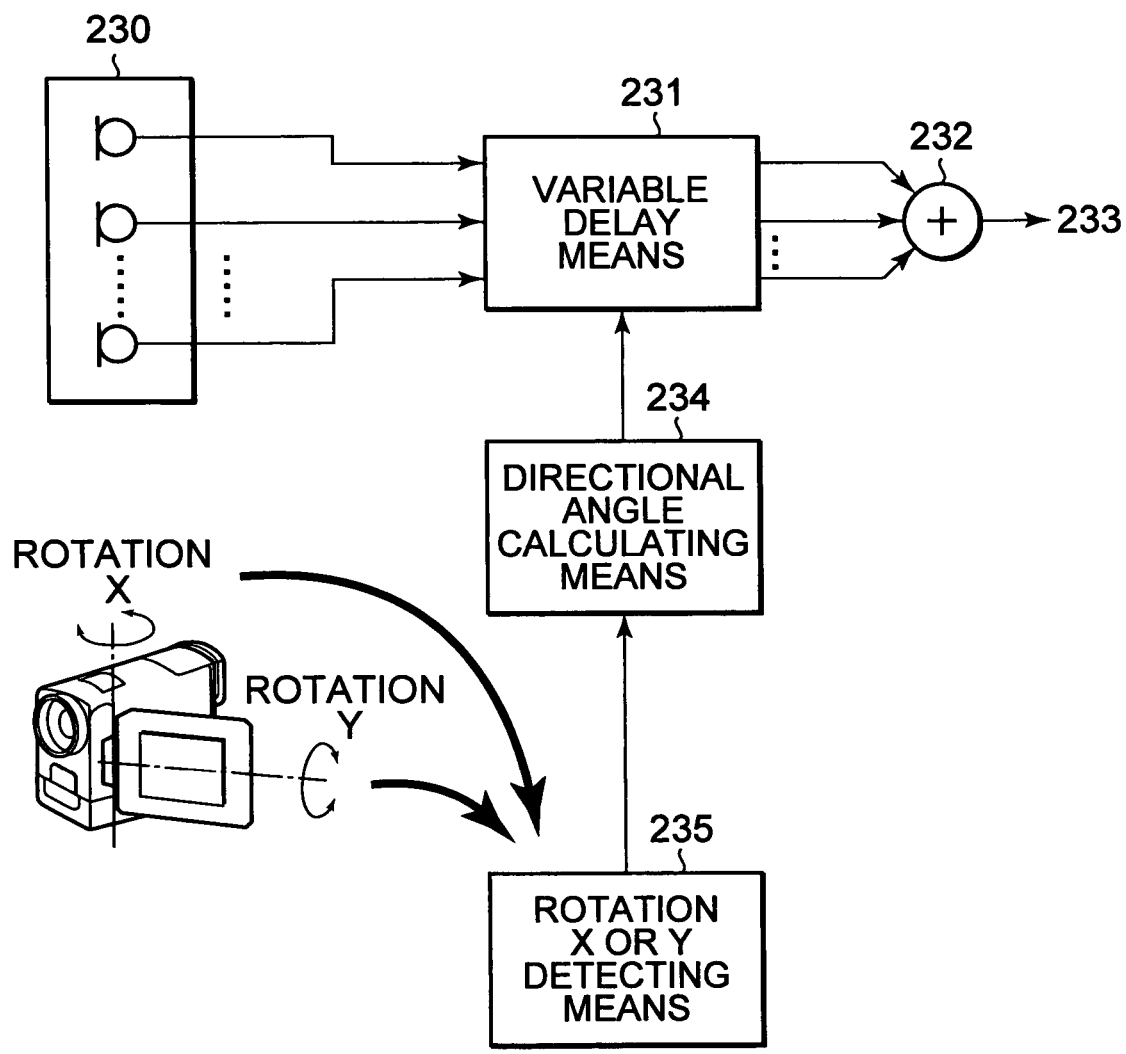
FIG. 23 is a schematic diagram showing a first example of a variably directional microphone.

A first example of a variably directional microphone using the theory of the array microphone is shown in FIG. 23. With reference to FIG. 23, the example of the variably directional microphone will be described. Outputs of an array microphone 230 are inputted to variably delay means 231. The variably delay means 231 independently delays each of the outputs of the array microphone 230.

In the delaying process, the rotation angle of the rotatable panel of the video camera is detected by rotation X or rotation Y detecting means 235. The delay periods of time are varied so that the directivity is maximized at the directional angle calculated by directional angle calculating means 234. Outputs of the variably delay means 231 are added by an adding circuit 232. As an audio signal output 233, regardless of the rotation of the rotatable panel, a sound or a voice from a designated direction, for example the forward direction, is outputted.

Figure 20:
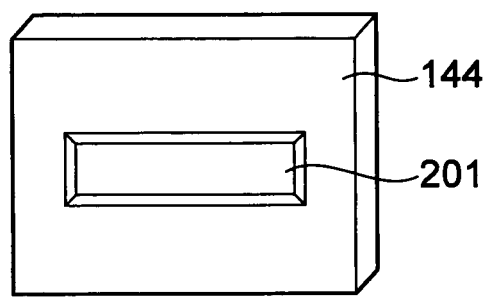
FIG. 20 is a schematic diagram showing a third example of the arrangement of a microphone.

FIG. 20 shows a third example of the arrangement of an array microphone. In the third example, an array microphone 201 is horizontally disposed on the rear surface of a rotatable panel type view finder 144. The arrangement of the array microphone is not limited to this example. The rotational angle detecting means 235 is a position sensor that detects a rotation angle. The position sensor is disposed at a rotating portion of the rotatable panel type view finder. The position sensor is composed of a Hall device or a resistor.

Figure 24:
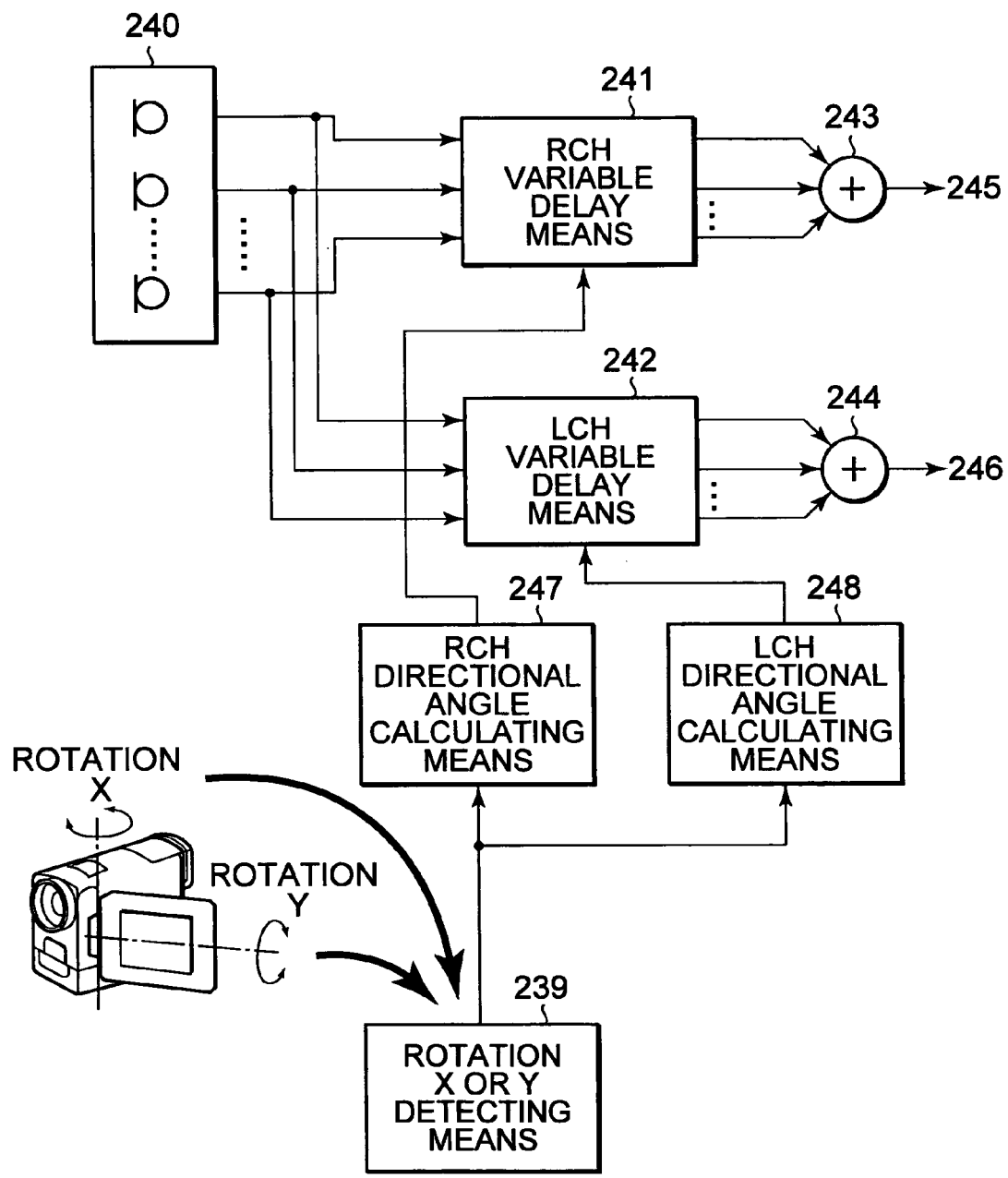
FIG. 24 is a schematic diagram showing a second example of a variably directional microphone.

FIG. 24 shows a second example of a variably directional microphone. In comparison with the array microphone shown in FIG. 23, the array microphone 240 shown in FIG. 24 outputs a plurality of audio outputs, for example two outputs Rch and Lch of stereo outputs. Outputs of the array microphone 240 that is same as the array microphone shown in FIG. 23 are inputted to Rch variably delay means 241 and Lch variably delay means 242.

Rotation X or rotation Y angle that is output from rotation angle detecting means 239 that is the same as the rotation angle detecting means shown in FIG. 23 is input to Rch directional angle calculating means 247 and Lch directional angle calculating means 248. The Rch directional angle calculating means 247 and the Lch directional angle calculating means 248 add new directional angles to the rotation angle detected in the rotation angle detecting means 239. The Rch directional angle calculating means 247 and the Lch directional angle calculating means 248 output delay periods of time to the Rch variably delay means 241 and the Lch variably delay means 242, so that the directivity is maximized at the directional angles. An adding circuit 243 and an adding circuit 244 add respective inputs and obtain an Rch output 245 and an Lch output 246, respectively.

Figure 18:
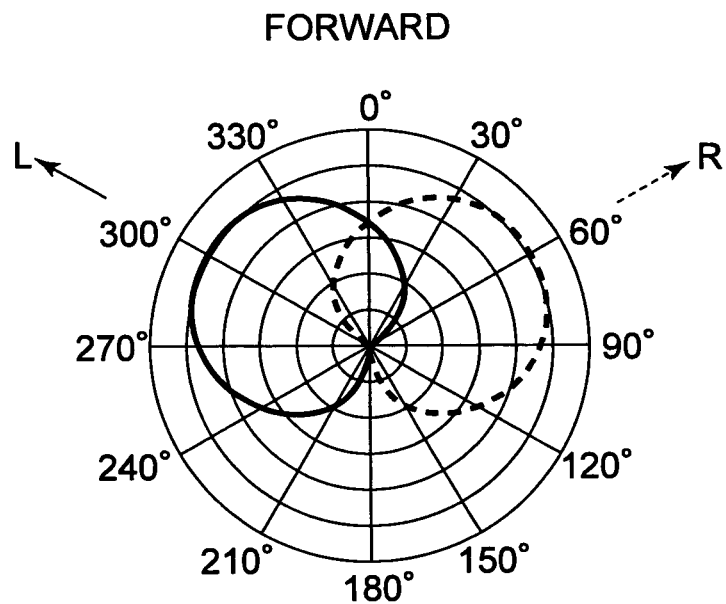
FIG. 18 is a schematic diagram showing a second embodiment of a stereo directivity.

Thus, the variably directional microphone shown in FIG. 24 can always obtain a stereo sound or a stereo voice from a designated direction, for example the forward direction regardless of the rotation of the rotatable panel type view finder. An example of the stereo characteristic is shown as a second characteristic example in FIG. 18. The embodiment describes the case of two outputs of the Rch output 245 and the Lch output 246. However, outputs in more directions than the embodiment can be simultaneously obtained.

In the foregoing embodiment, the case of one array microphone is described. However, the user usually takes an object in the state that the rotatable panel type view finder is fully opened in the rotation range from the close position to the fully open position. Thus, when the user images an object, the rotation X direction matches the forward direction. In this case, the rotation angle detecting means 239 may be configured, so that it can detect only the rotation Y direction.

Figure 22:
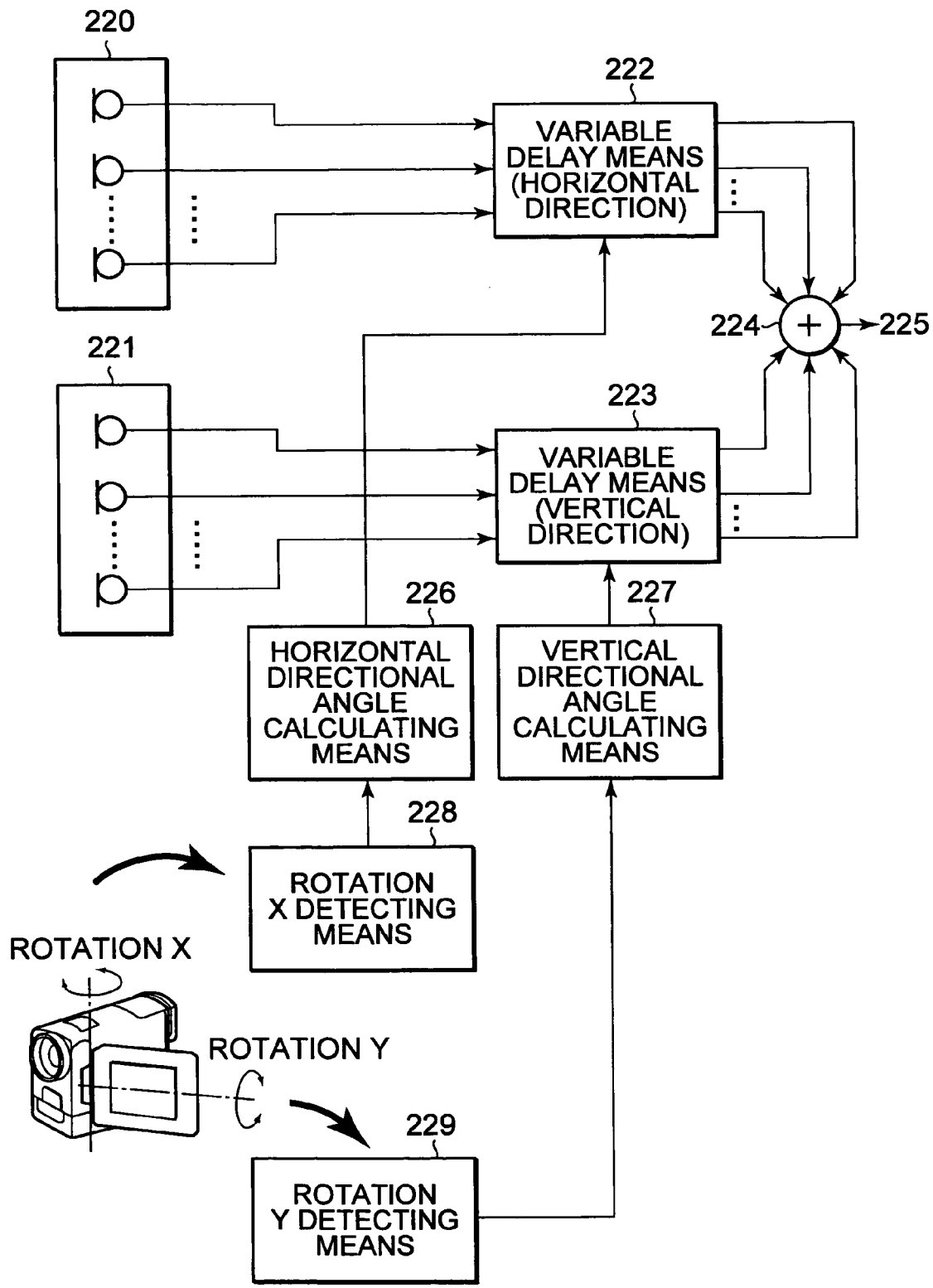
FIG. 22 is a schematic diagram showing a third example of a variably directional microphone.

However, it is possible to compensate both the rotation X direction and the rotation Y direction at the same time. In this case, according to the embodiment of the present invention, in a third example of a variably directional microphone shown in FIG. 22, a horizontal array microphone 220 and a vertical array microphone 221 are disposed. Outputs of the horizontal array microphone 220 and the vertical array microphone 221 are inputted to horizontally variably delay means 222 and vertically variably delay means 223, respectively.

Rotation angles that are output from rotation X detecting means 228 and rotation Y detecting means 229 are inputted to horizontally directional angle calculating means 226 and vertically directional angle calculating means 227, respectively. The horizontally variably delay means 222 and the vertically variably delay means 223 vary delay periods of time, so that the directivity is maximized at the calculated horizontally/vertically directional angles. The adding circuit 244 adds all inputs. Thus, as an audio signal output 225, regardless of the rotation of the rotatable panel type view finder in the X direction and Y direction, a sound or a voice from the designated direction, for example, the forward direction is always outputted.

Figure 21:
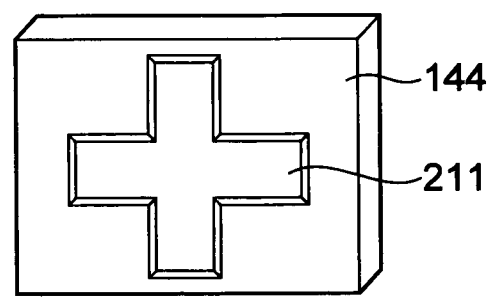
FIG. 21 is a schematic diagram showing a fourth example of the arrangement of a microphone.

FIG. 21 shows a fourth example of the arrangement of a microphone. In the fourth example, an array microphone 211 is disposed in the horizontal and vertical directions on the rear surface of the rotatable panel type view finder 144. However, the arrangement of the array microphone is not limited to the example.

As described above, according to the present invention, the structure using many microphone units as an array microphone can be easily accomplished in a small video camera. Thus, the directivity of the microphone can be varied. In addition, a microphone having super directivity can be easily accomplished. As a result, the foregoing fourth merit can be satisfied.

The microphone position C 147 may be added so that the demerit of the conventional microphone position A 145 or B 146 can be compensated.

For example, a conventional stereo characteristic (FIG. 16 or FIG. 18) is obtained with a microphone disposed at the position A 145 or B 146. In addition, the characteristic shown in FIG. 15 is obtained by a microphone disposed at the position C 147. When they are combined, a sound or a voice in a desired direction can be obtained by the microphone at the position C 147, while a sound field presence having a stereo characteristic can be obtained by the microphone disposed at the position A 145 or B 146. As a result, the foregoing fifth merit can be satisfied.

Next, with reference to FIG. 25, an example of the structure of the foregoing variably delay means will be described. In this example, the first example of the variably delay means shown in FIG. 8 will be described. In the array microphone according to the present invention, to have the directivity at any directional angle that the user points, directional angle calculating means 83 should input a directional angle signal 254 calculated with the zoom position signal 77 and the pointing position signal 78 to variably delay means 252 so as to designate an optimum delay in a desired direction.

Figure 25:
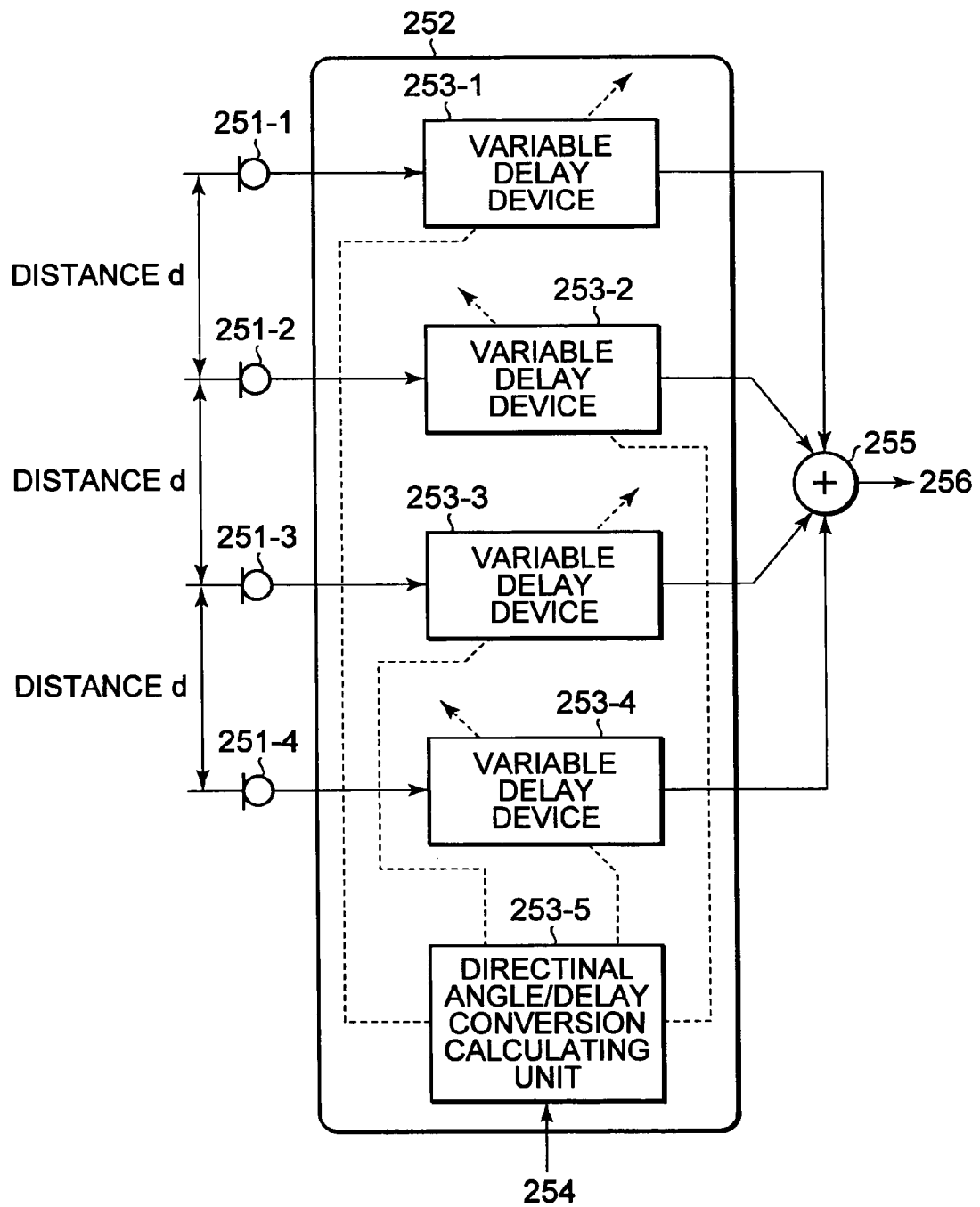
FIG. 25 is a schematic diagram showing an example of variably delay means.

FIG. 25 shows an actual example of variably delay means 252. Like the array microphone shown in FIG. 8, an array microphone having four microphones 251-1 to 251-4 disposed on a line at equal intervals of a distance of d will be described as shown in FIG. 25. Outputs of the microphone 251-1 to 251-4 are input to the variably delay means 252. Variably delay devices 253-1 to 253-4 optimally delay their input signals. An adding circuit 255 adds all inputs and outputs the added signal as an output 256.

A directional angle/delay conversion calculating portion 253-5 independently designates delay amounts of the variably delay devices 253-1 to 253-4. The directional angle/delay conversion calculating unit 253-5 calculates optimum delay amounts in accordance with the directional angle signal 254 calculated with the zoom position signal 77 and the pointing position signal 78.

Figure 26:
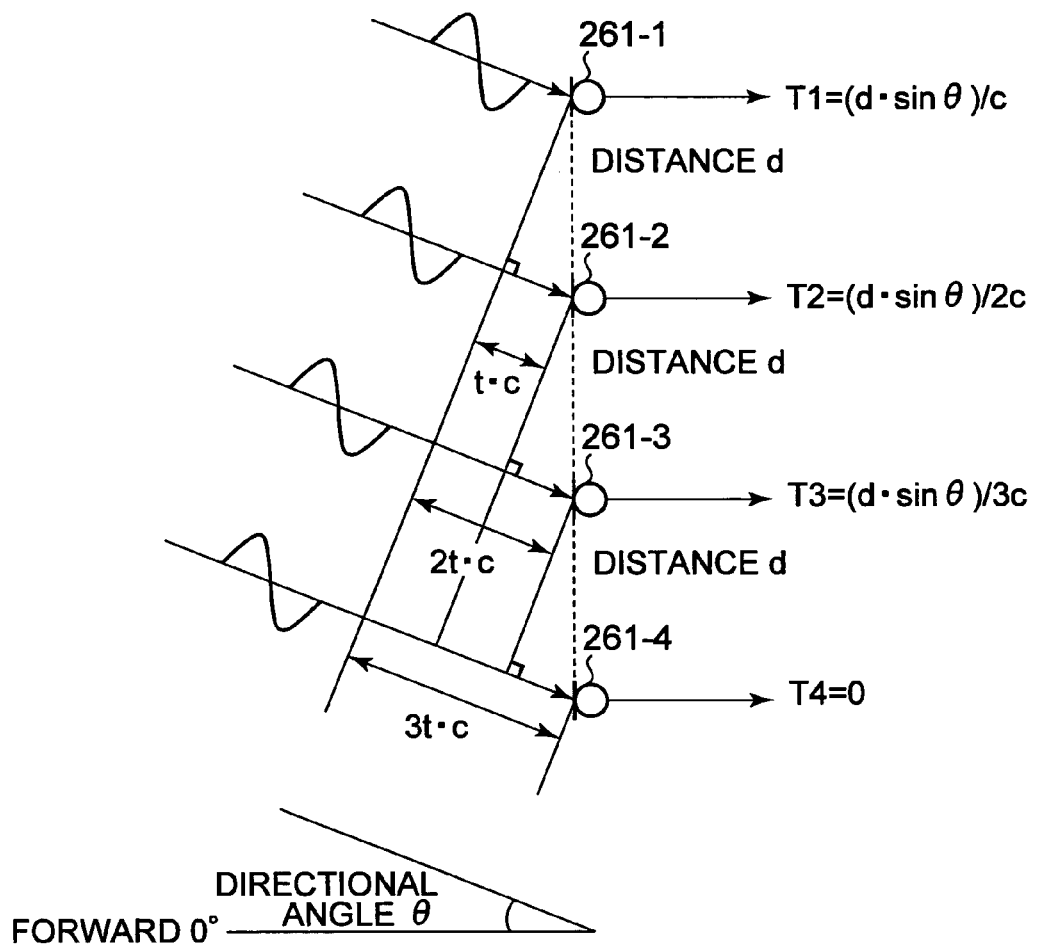
FIG. 26 is a first schematic diagram describing directional angle/delay conversion.
Figures 27, 28:
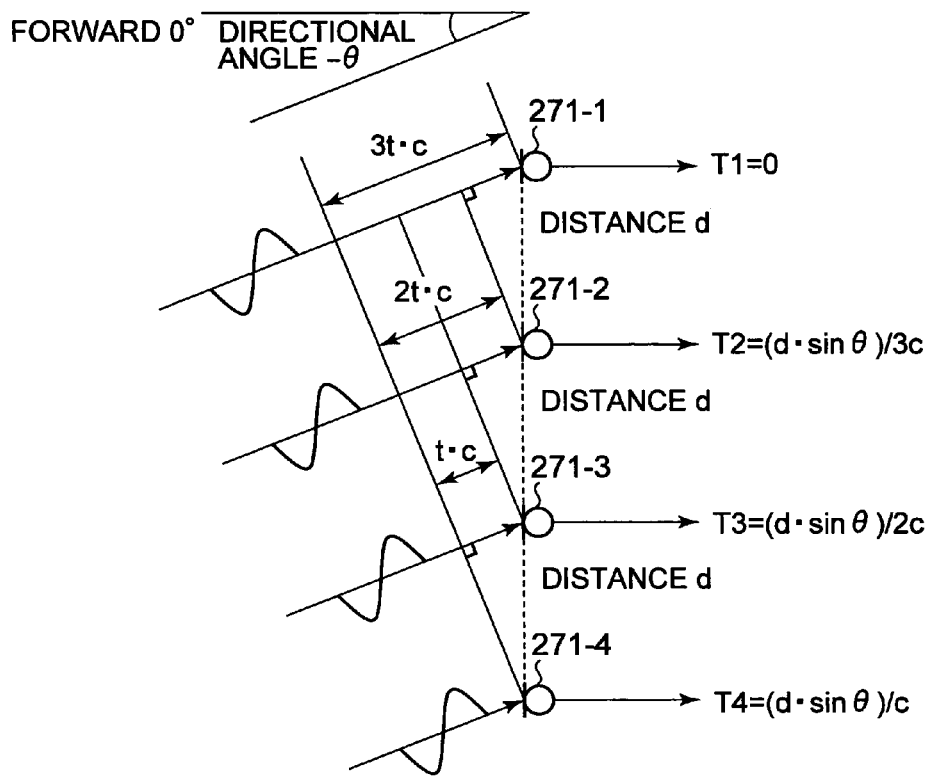
FIG. 27 is a second schematic diagram describing directional angle/delay conversion.
FIG. 28 is a schematic diagram showing an example of directional angle/delay conversion.

Next, with reference to FIG. 26 and FIG. 27, the directional angle/delay conversion calculating unit 253-5 shown in FIG. 25 will be described. On a plane that contains all microphones disposed on a line, the forward direction of the microphones is defined as 0 degree. FIG. 26 shows a directional angle $\theta$ in the direction of a microphone 261-1 side, the directional angle $\theta$ varying from 0 degree to 90 degrees (maximum). Likewise, FIG. 27 shows a directional angle $\theta$ in the direction of a microphone 271-4 side, the directional angle $\theta$ varying from 0 degree to −90 degrees (maximum).

When a sound enters at a directional angle $\theta$ as shown in FIG. 26, assuming that the relative distance difference between a microphone 261-1 and a microphone 261-2 is denoted by tc, the relative distance difference between the microphone 261-1 and a microphone 261-3 is denoted by 2tc, and the relative distance difference between the microphone 261-1 and a microphone 261-4 is denoted by 3tc, delay amounts T1 to T4 designated by the variably delay devices 253-1 to 253-4 disposed on the downstream stage of the microphones 261-1 to 261-4 are given by the following Formula 2.

$$T1 = (d \cdot \sin \theta)/c,$$

$$T2 = (d \cdot \sin \theta)/2c,$$

$$T3 = (d \cdot \sin \theta)/3c,$$

$$T4 = 0, \qquad \text{[Formula 2]}$$

where d represents the distance between adjacent microphones, and c represents the speed of sound.

Likewise, when a sound enters at a directional angle −$\theta$ as shown in FIG. 27, assuming that the relative distance difference between a microphone 271-4 and a microphone 271-1 is denoted by 3tc, the relative distance difference between the microphone 271-4 and a microphone 271-2 is denoted by 2tc, and the relative distance difference between the microphone 271-4 and a microphone 271-3 is denoted by tc, delay amounts T1 to T4 designated by the variably delay device 253-1 to variably delay device 253-4 disposed on the downstream stage of the microphone 271-1 to microphone 271-4 are given by the following Formula 3.

$$T1 = 0,$$

$$T2 = (d \cdot \sin \theta)/3c,$$

$$T3 = (d \cdot \sin \theta)/2c,$$

$$T4 = (d \cdot \sin \theta)/c, \qquad \text{[Formula 3]}$$

As an example, at room temperature, assuming that the distance between adjacent microphones is 10 mm, the delay amounts T1 to T4 against the representative directional angle $\theta$ are obtained from a directional angle/delay conversion table 281 shown in FIG. 28.

When a directional angle $\theta$ 282 varies from 90 degrees to −90 degrees on the directional angle/delay conversion table 281 shown in FIG. 28, a delay amount T ($\mu$s) 282 varies from top to bottom of columns T1 to T4, respectively.

Thus, with the foregoing delay amounts, the array microphone according to the present invention can obtain an output with directivity at any directional angle θ that the user points. In the foregoing embodiment, the number of microphones, the distance between adjacent microphones, and the arrangement of the microphones are just an example. Although the microphones may be structured in other than the foregoing example, when optimum delay amounts are designated by the variably delay means, the same effect as the foregoing embodiment can be obtained.

When two identical array microphones are disposed in the horizontal direction and the vertical direction, an output with directivity can be generated at a directional angle in the direction of the vector sum of both the microphones.

What is claimed is:

1. A video camera, comprising:
   image taking means having a body containing at least an image pickup device, a lens provided on a first surface of the body and an eye piece view finder provided on a second surface of the body opposite to the first surface, the image taking means having an optical axis;
   panel type view finder, attached to a side surface of the body of the image taking means adjacent to the lens, for displaying a picture taken by said image taking means, said panel type view finder rotatable about both an X axis direction and a Y axis direction which are perpendicular to the optical axis;
   sound collecting means having a first microphone unit disposed on a rear surface side of said panel type view finder, a second microphone unit disposed on the first surface of the body and a third microphone unit disposed on an upper surface of the body, said sound collecting means having a sound directivity which is variable; and
   sound directivity generating means for changing the sound directivity with which said sound collecting means collects the sound, wherein;
   said panel type view finder, with said first microphone unit of said sound collecting means disposed thereon, rotate together, and
   said sound directivity generating means change the sound directivity of said sound collecting means based upon a rotation angle about the axis perpendicular to the optical axis of said panel type view finder.

2. The video camera as set forth in claim 1,
   wherein; said sound collecting means has variably delay means for delaying outputs of a plurality of microphone units; and
   calculating means for adding outputs of said variably delay means, and wherein;
   an output of said calculating means causes the delay amount delayed by said variably delay means to vary in accordance with position information obtained from said detecting means in a rotatable range of said panel type view finder so as to vary a sound collecting characteristic.

3. The video camera as set forth in claim 1, wherein;
   said sound collecting means has a stereo characteristic.

4. The video camera as set forth in claim 3, wherein;
   said sound collecting means has variably delay means for delaying outputs of a plurality of microphone units; and
   calculating means for adding outputs of said variably delay means, and wherein;
   an output of said calculating means causes the delay amount delayed by said variably delay means to vary in accordance with position information obtained from said detecting means in a rotatable range of said panel view finder so as to vary a sound collecting characteristic.

5. The video camera as set forth in claim 1, wherein said panel type view finder is movable between a closed position that is in parallel with a direction of an optical axis of the image taking means and an open position that is perpendicular to the direction of the optical axis of the image taking means.

6. The video camera as set forth in claim 1, wherein the body of the image taking means also containing an image-taking optical system.

7. A video camera, comprising:
   image taking unit having a body containing at least an image pickup device, a lens provided on a first surface of the body and an eyepiece view finder provided on a second surface of the body opposite the first surface, the image taking unit having an optical axis;
   panel type view finder display unit, rotatably attached to a side surface of the body of the image taking unit adjacent the lens, which displays a picture taken by said image taking unit, wherein the panel type view finder display unit is rotatable about both an X axis and a Y axis; and
   sound collecting unit having a first microphone unit disposed on a rear surface of said panel type view finder display unit, a second microphone unit disposed on the first surface of the body and a third microphone unit disposed on an upper surface of the body, wherein;
   said panel type view finder, with said first microphone unit of said sound collecting unit disposed thereon, rotate together about an axis perpendicular to the optical axis.

8. A microphone apparatus, comprising:
   displaying unit, rotatably attached to a side surface of a body of an image taking unit adjacent to a lens, the image taking unit having the body containing at least an image pickup device, the displaying unit displaying a picture taken by said image taking unit;
   rotation determining unit determining a rotating angle of the displaying unit about an axis perpendicular to an optical axis,
   sound collecting unit having a first microphone unit disposed on a rear surface of said displaying unit and having a sound directivity which is variable, a second microphone unit disposed on the first surface of the body and a third microphone unit disposed on an upper surface of the body; and
   sound directivity generating unit changing the sound directivity with which said sound collecting unit collects the sound;
   wherein said displaying unit, with said first microphone unit of said sound collecting unit disposed thereon, rotates together, and
   said sound directivity generating unit changes the sound directivity of the sound collecting means based upon the rotating angle of said displaying unit determined by the rotation determining unit.

9. The microphone apparatus as set forth in claim 8, wherein:
   said directivity generating unit has variably delay unit delaying an output of the microphone unit of said sound collecting unit; and
   calculating unit adding outputs of said variably delay unit, and wherein;
   delay amounts of said variably delay unit are varied, and a level of the output of said calculating unit is maximized in a predetermined direction.

10. The microphone apparatus as set forth in claim 8, further comprising:
   level controlling unit controlling the level of the sound directivity signal extracted by said directivity generating unit so as to control the sound directivity signal to be a predetermined level and output the controlled sound and directivity signal.

11. The microphone apparatus as set forth in claim 8 further comprising:
   the image taking means further having an image taking optical system including a zoom lens;
   a point on the displaying unit changes by an angle of view based on a zoom position of the zoom lens;
   pointing unit detecting a position of the object on a display screen when a user touches the picture displayed on the displaying unit; and
   determining unit determining an angular direction of the object in the picture on the displaying unit in accordance with (a) the position detected by said pointing unit and (b) the zoom position of the zoom lens; and
   said directivity generating unit changing the directivity with which said sound collecting unit collects the sound based upon the angular direction determined by said determining unit, wherein a direction of the object, that the user indicates, is compensated based upon the zoom position of the zoom lens.

12. The microphone apparatus as set forth in claim 11, wherein;
   said pointing unit is composed of a light transmitting member, and
   said pointing unit is disposed on a display surface of said displaying unit.

13. The microphone apparatus as set forth in claim 11, wherein;
   said determining unit is configured to determine the direction of the object in accordance with information of angle of view obtained by said image taking unit and a command position obtained by said pointing unit.

14. A method of operating a microphone apparatus, comprising the steps of:
   providing a displaying unit, rotatably attached to a side surface of a body of image taking unit adjacent to a lens, the image taking unit having the body containing at least an image pickup device:
   determining a rotation angle of the displaying unit about an axis perpendicular to an optical axis;
   displaying a picture taken by said image taking unit;
   providing a sound collecting unit having a first microphone unit disposed on a rear surface of said displaying unit, a second microphone unit disposed on the first surface of the body and a third microphone unit disposed on an upper surface of the body and having a sound directivity which is variable; and
   providing a sound directivity generating unit changing the sound directivity with which said sound collecting unit collects the sound;
   wherein said displaying unit, with said first microphone unit of sound collecting unit disposed thereon, rotates together; and
   said sound directivity generating unit changes the sound directivity of the sound collecting means based upon the determined rotation angle of said displaying unit.

* * * * *